US011982932B2

(12) United States Patent
Yamakage et al.

(10) Patent No.: US 11,982,932 B2
(45) Date of Patent: May 14, 2024

(54) PROJECTION DISPLAY DEVICE

(71) Applicant: Light Show Technology Co., LTD., Tokyo (JP)

(72) Inventors: Akihiro Yamakage, Tokyo (JP); Shigeru Taguchi, Tokyo (JP); Yufei Mei, Tokyo (JP)

(73) Assignee: LIGHT SHOW TECHNOLOGY CO., LTD., Tokyo (JP)

( * ) Notice: Subject to any disclaimer, the term of this patent is extended or adjusted under 35 U.S.C. 154(b) by 63 days.

(21) Appl. No.: 17/979,868

(22) Filed: Nov. 3, 2022

(65) Prior Publication Data

US 2023/0324779 A1 Oct. 12, 2023

(30) Foreign Application Priority Data

Mar. 25, 2022 (JP) .................................. 2022-049305
Jun. 30, 2022 (JP) .................................. 2022-106071

(51) Int. Cl.
*G03B 21/20* (2006.01)
*G03B 21/14* (2006.01)
*G03B 21/56* (2006.01)

(52) U.S. Cl.
CPC ......... *G03B 21/208* (2013.01); *G03B 21/142* (2013.01); *G03B 21/2013* (2013.01); *G03B 21/2033* (2013.01); *G03B 21/567* (2013.01)

(58) Field of Classification Search
CPC .............. G03B 21/142; G03B 21/2013; G03B 21/2033; G03B 21/2066; G03B 21/208;

(Continued)

(56) References Cited

U.S. PATENT DOCUMENTS 6,652,104 B2 * 11/2003 Nishida ................ H04N 9/3185
353/69
6,877,863 B2 * 4/2005 Wood ................... H04N 9/3185
353/42

(Continued)

FOREIGN PATENT DOCUMENTS

JP 2000-180759 6/2000

OTHER PUBLICATIONS

Extended European Search Report dated Aug. 22, 2023 in corresponding European Patent Application No. 22206392.7.

*Primary Examiner* — Michael B. Pierorazio
(74) *Attorney, Agent, or Firm* — Wenderoth, Lind & Ponack, L.L.P.

(57) ABSTRACT

A projection display device includes a plurality of semiconductor lasers, a collimating lens, an integrator illumination system, a deflection element, a transfer optical system, and a projection lens. The collimating lens is configured to collimate a plurality of laser beams output from the plurality of semiconductor lasers. The integrator illumination system is configured to overlap the plurality of laser beams collimated by the collimating lens to form a rectangular illumination region. The deflection element is disposed at a position closer to the collimating lens than a position where the rectangular illumination region is formed by the integrator illumination system. The transfer optical system is configured to enlarge and transfer the rectangular illumination region deflection-scanned by the deflection element to a reflective optical modulation element. The projection lens is configured to project video light output from the reflective optical modulation element.

9 Claims, 17 Drawing Sheets

(58) Field of Classification Search
CPC .. G03B 21/567; H04N 9/3117; H04N 9/3152; H04N 9/3164
See application file for complete search history.

(56) References Cited

U.S. PATENT DOCUMENTS

| | | | | |
|---|---|---|---|---|
| 7,070,283 B2* | 7/2006 | Akutsu | ............... | H04N 5/74 |
| | | | | 353/30 |
| 7,182,466 B2* | 2/2007 | Sunaga | ............... | H04N 5/74 |
| | | | | 353/69 |
| 7,270,421 B2* | 9/2007 | Shinozaki | ............ | G03B 21/142 |
| | | | | 353/121 |
| 7,359,575 B2* | 4/2008 | Bassi | ............... | G06T 3/18 |
| | | | | 345/427 |
| 7,441,906 B1* | 10/2008 | Wang | ............... | G03B 21/14 |
| | | | | 353/121 |
| 7,782,387 B2* | 8/2010 | Azuma | ............... | H04N 23/635 |
| | | | | 359/662 |
| 9,329,460 B2* | 5/2016 | Iijima | ............... | G03B 21/006 |
| 2002/0051095 A1* | 5/2002 | Su | ............... | H04N 9/3194 |
| | | | | 348/745 |
| 2002/0122161 A1* | 9/2002 | Nishida | ............... | H04N 9/3194 |
| | | | | 353/70 |
| 2003/0191836 A1* | 10/2003 | Murtha | ............... | H04L 67/02 |
| | | | | 709/224 |
| 2003/0210381 A1* | 11/2003 | Itaki | ............... | H04N 5/74 |
| | | | | 353/70 |
| 2004/0061839 A1* | 4/2004 | Kim | ............... | H04N 9/3117 |
| | | | | 348/E9.027 |
| 2004/0080718 A1* | 4/2004 | Kojima | ............... | G03B 33/12 |
| | | | | 348/E9.027 |
| 2004/0105077 A1* | 6/2004 | Kim | ............... | G02B 27/123 |
| | | | | 353/31 |
| 2004/0156024 A1* | 8/2004 | Matsuda | ............ | H04N 9/3185 |
| | | | | 353/70 |
| 2005/0046803 A1* | 3/2005 | Akutsu | ............... | H04N 5/74 |
| | | | | 353/69 |
| 2005/0073661 A1* | 4/2005 | Tamura | ............... | H04N 9/3194 |
| | | | | 353/70 |
| 2005/0151934 A1* | 7/2005 | Akutsu | ............... | G03B 21/147 |
| | | | | 353/69 |
| 2005/0237492 A1* | 10/2005 | Shinozaki | ............ | H04N 9/3185 |
| | | | | 353/69 |
| 2006/0098167 A1* | 5/2006 | Sato | ............... | G03B 21/26 |
| | | | | 353/35 |
| 2006/0114417 A1* | 6/2006 | Lee | ............... | G03B 33/06 |
| | | | | 353/33 |
| 2006/0114420 A1* | 6/2006 | Kim | ............... | G03B 21/2013 |
| | | | | 353/81 |
| 2006/0203207 A1* | 9/2006 | Ikeda | ............... | H04N 9/3185 |
| | | | | 353/70 |
| 2007/0008344 A1* | 1/2007 | Medina | ............... | G06T 15/10 |
| | | | | 345/647 |
| 2007/0019163 A1* | 1/2007 | Ikeda | ............... | G03B 21/208 |
| | | | | 348/E9.027 |
| 2007/0257941 A1* | 11/2007 | Plut | ............... | G06F 9/451 |
| | | | | 345/660 |
| 2007/0285626 A1* | 12/2007 | Miyasaka | ............ | G03B 21/206 |
| | | | | 353/85 |
| 2008/0284920 A1* | 11/2008 | Facius | ............... | H04N 9/3164 |
| | | | | 348/751 |
| 2009/0278999 A1* | 11/2009 | Ofune | ............... | H04N 21/47 |
| | | | | 348/E3.048 |
| 2010/0002123 A1* | 1/2010 | Nozaki | ............... | H04N 23/00 |
| | | | | 348/E5.022 |
| 2010/0045942 A1* | 2/2010 | Furui | ............... | H04N 9/3194 |
| | | | | 353/69 |
| 2011/0085044 A1* | 4/2011 | Noda | ............... | G03B 21/58 |
| | | | | 348/E5.133 |
| 2011/0210979 A1* | 9/2011 | Furui | ............... | G03B 37/04 |
| | | | | 345/619 |
| 2011/0234994 A1* | 9/2011 | Uchiyama | ............ | H04N 9/3185 |
| | | | | 353/121 |
| 2011/0285971 A1* | 11/2011 | Oka | ............... | H04N 9/3185 |
| | | | | 353/70 |
| 2011/0292351 A1* | 12/2011 | Ishii | ............... | H04N 9/3185 |
| | | | | 353/69 |
| 2018/0158102 A1* | 6/2018 | Choi | ............... | G06Q 30/0251 |

* cited by examiner $\alpha - 2\theta \leq$ ANGLE OF REFLECTED BEAM WITH RESPECT TO BX $\leq \alpha + 2\theta$

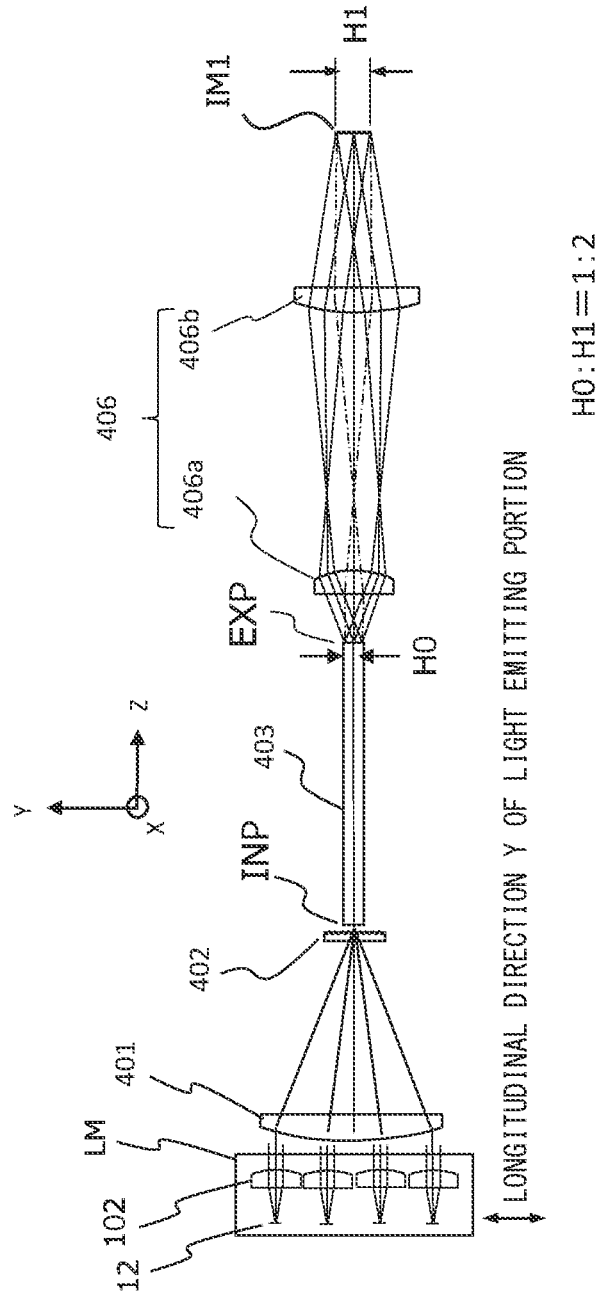

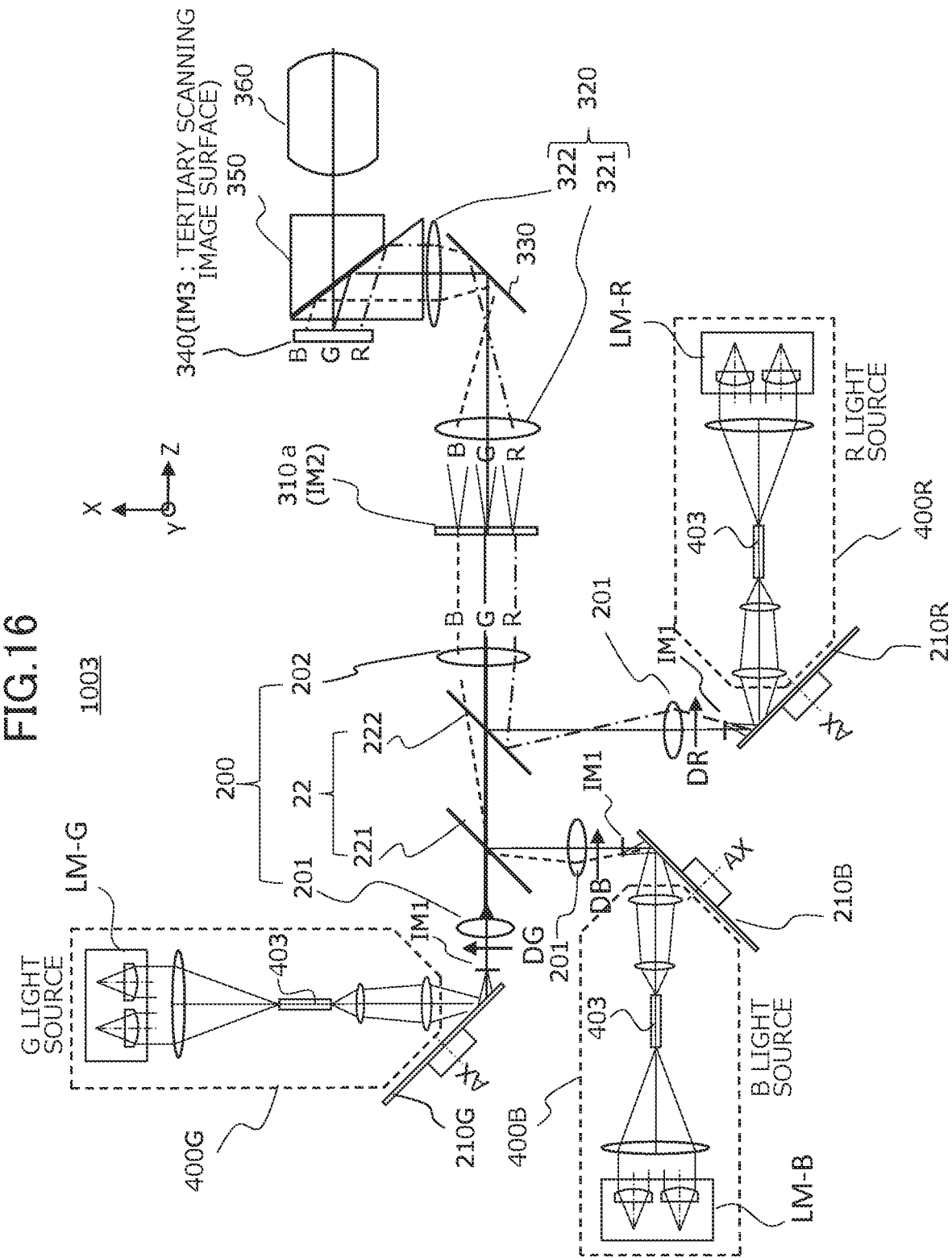

V0x : V1x = 1 : 1

V0y : V1y = 1 : 2

PROJECTION DISPLAY DEVICE

BACKGROUND OF THE INVENTION

Field of the Invention

The present invention relates to a projection display device including a light source device.

Description of the Related Art

Hitherto, a projection display device using laser light has been known. Japanese Patent Application Laid-Open No. 2000-180759 discloses a projection display device including a laser light source, a photoacoustic modulator that optically modulates laser light according to a video signal, a polygonal mirror that performs horizontal scanning by the modulated laser light, and a galvanometer mirror that performs vertical scanning by the modulated laser light.

The projection display device described in Japanese Patent Application Laid-Open No. 2000-180759 includes an optical scanning unit using both the polygonal mirror for horizontal scanning and the galvanometer mirror for vertical scanning. However, since optical scanning is performed in both horizontal and vertical directions, a large optical path space is required, and the device thus has a large size, which is problematic.

Therefore, in the field of a projection image display device that modulates and projects laser light according to an image signal, it has been expected to implement a compact device for which driving control is easy and which has a high light use efficiency.

SUMMARY OF THE INVENTION

According to a first aspect of the present invention, a projection display device includes a plurality of semiconductor lasers, a collimating lens, an integrator illumination system, a deflection element, a transfer optical system, and a projection lens. The collimating lens is configured to collimate a plurality of laser beams output from the plurality of semiconductor lasers. The integrator illumination system is configured to overlap the plurality of laser beams collimated by the collimating lens to form a rectangular illumination region. The deflection element is disposed at a position closer to the collimating lens than a position where the rectangular illumination region is formed by the integrator illumination system. The transfer optical system is configured to enlarge and transfer the rectangular illumination region deflection-scanned by the deflection element to a reflective optical modulation element. The projection lens is configured to project video light output from the reflective optical modulation element.

Further features of the present invention will become apparent from the following description of exemplary embodiments with reference to the attached drawings.

BRIEF DESCRIPTION OF THE DRAWINGS

FIG. 11 is a view for describing an integrator illumination system according to a third embodiment.

FIG. 16 is a view illustrating a schematic configuration of an optical system of a projection display device according to a fourth embodiment.

DESCRIPTION OF THE EMBODIMENTS

Figure 1:
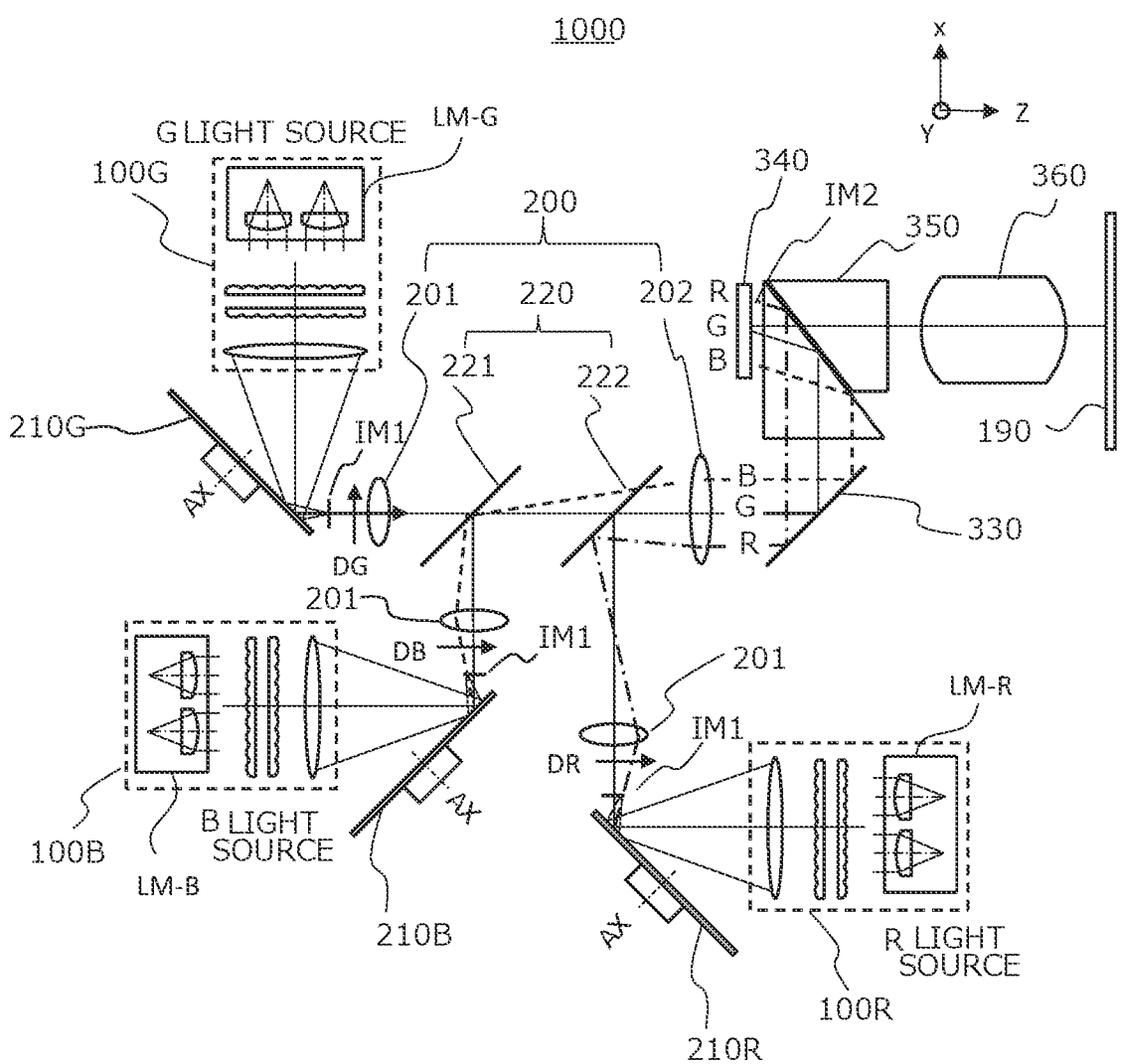
FIG. 1 is a view illustrating a schematic configuration of an optical system of a projection display device according to a first embodiment.

A projection display device according to each embodiment of the present invention will be described with reference to the drawings. The embodiments described below are merely examples, and for example, detailed configurations can be appropriately changed and implemented by those skilled in the art without departing from the gist of the present invention. In the drawings referred to in the following embodiments and description, elements denoted by the same reference signs have the same functions unless otherwise specified. Since optical elements in the drawings are schematically illustrated, actual shapes or configurations are not necessarily faithfully illustrated. For example, even in a case where an optical element is drawn as a single lens in the drawings, the optical element may be implemented by a plurality of lenses unless otherwise specified.

In the following description, for example, a +X direction indicates the same direction as that indicated by an X-axis arrow in the illustrated coordinate system, and a −X direction indicates a direction 180 degrees opposite to that indicated by the X-axis arrow in the illustrated coordinate system. In addition, a direction simply referred to as an X direction is a direction parallel to an X axis regardless of a difference from the direction indicated by the illustrated X-axis arrow. The same applies to directions other than the X direction.

In the following description, red may be referred to as "R", green may be referred to as "G", and blue may be referred to as "B". Therefore, for example, R light is synonymous with red light, a G light source is synonymous with a green light source, and B laser is synonymous with blue laser.

First Embodiment

FIG. 1 is a view illustrating a schematic configuration of an optical system of a projection display device according to a first embodiment. For convenience of description, a mechanical mechanism for installing an optical element, a casing, electrical wiring, and the like are omitted in the drawing.

Overall Configuration

A projection display device 1000 includes a B light source 100B, a G light source 100G, an R light source 100R, a B deflector 210B, a G deflector 210G, an R deflector 210R, a light combining unit 220, an optical path conversion mirror 330, a TIR prism 350, a reflective optical modulation element 340, and a projection lens 360. A front transfer lens 201 is disposed between the deflectors of the respective colors and the light combining unit 220, and a rear transfer lens 202 is disposed between the light combining unit 220 and the optical path conversion mirror 330.

The light combining unit 220 includes a dichroic mirror 221 and a dichroic mirror 222. The projection display device 1000 can optionally include a projection screen 190.

The B light source 100B includes a semiconductor laser that emits B light, the G light source 100G includes a semiconductor laser that emits G light, and the R light source 100R includes a semiconductor laser that emits R light. The light sources will be described in detail below.

The B deflector 210B is a deflector that deflects B light emitted from the B light source 100B in a DB direction. Similarly, the G deflector 210G is a deflector that deflects G light emitted from the G light source 100G in a DG direction, and the R deflector 210R is a deflector that deflects R light emitted from the R light source 100R in a DR direction. The deflectors will be described in detail below.

The light combining unit 220 includes the dichroic mirror 221 and the dichroic mirror 222. The dichroic mirror 221 has an optical characteristic of transmitting the G light and reflecting the B light. The dichroic mirror 222 has an optical characteristic of transmitting the G light and the B light and reflecting the R light. The optical elements are arranged in such a way that an optical axis center of the front transfer lens 201 for B light and an optical axis center of the front transfer lens 201 for G light overlap with each other on the dichroic mirror 221. Further, the optical elements are arranged in such a way that the optical axis center of the front transfer lens 201 for B light, the optical axis center of the front transfer lens 201 for G light, and an optical axis center of the front transfer lens 201 for R light overlap with one another on the dichroic mirror 222.

The B light (dotted line), the G light (solid line), and the R light (a line with alternating long and short dashes) all travel in a +Z direction by the light combining unit 220, but these lights are combined in such a way as not to overlap each other at any timing. This is because timings for deflection scanning (phases of deflection) by the B deflector 210B, the G deflector 210G, and the R deflector 210R are controlled in such a way that the B light, the G light, and the R light do not overlap each other on a screen of the reflective optical modulation element 340. A scanning method will be described in detail below.

The courses of the B light, the G light, and the R light emitted from the light combining unit 220 are changed to be directed in the +X direction by the optical path conversion mirror 330, and as a result of which the B light, the G light, and the R light are incident on the TIR prism 350.

The TIR prism 350 is, for example, an internal total reflection prism implemented by combining two prisms, and totally reflects illumination light (B light, G light, and R light) with an air gap surface and makes the illumination light be incident on the reflective optical modulation element 340 at a predetermined angle. As described above, each of the B light, the G light, and the R light illuminates a part of the screen of the reflective optical modulation element 340 in such a way as not to overlap each other.

For example, a digital micromirror device (DMD) in which micromirror devices are provided in an array is used for the reflective optical modulation element 340. A micromirror corresponding to each display pixel is driven in such a way that a reflection direction is changed by pulse width modulation according to a luminance level of a video signal. However, it is also possible to use another type of reflective optical modulation device such as a reflective liquid crystal device.

A pixel in a screen region illuminated with the B light is driven according to a luminance level of a B component of a video signal and reflects B video light toward the TIR prism 350 at a predetermined angle. Similarly, a pixel in a screen region illuminated with the G light is driven according to a luminance level of a G component of a video signal and reflects G video light toward the TIR prism 350 at a predetermined angle. Furthermore, a pixel in a screen region illuminated with the R light is driven according to a luminance level of a R component of a video signal and reflects R video light toward the TIR prism 350 at a predetermined angle. As described above, a modulation operation of the reflective optical modulation device is performed in synchronization with deflection scanning performed by the B deflector 210B, the G deflector 210G, and the R deflector 210R.

The video light (B video light, G video light, and R video light) is transmitted through the TIR prism 350, guided to the projection lens 360, and projected as a color image. The projection lens 360 can be implemented by one or more lenses and have an auto-focusing function or a zoom function.

The projection screen 190 is used in a case of implementing a rear projection display device. Although the projection screen 190 is often installed in a front projection display device as well, there is no need to install the projection screen 190 in a case where a user projects light onto an arbitrary wall surface or the like.

Light Source

The B light source 100B, the G light source 100G, and the R light source 100R will be described. The B light source 100B includes a laser module LM-B including a semiconductor laser that emits the Blight and a collimating lens, the G light source 100G includes a laser module LM-G including a semiconductor laser that emits the G light and a collimating lens, and the R light source 100R includes a laser module LM-R including a semiconductor laser that emits the R light and a collimating lens. The basic configurations of the light sources of the respective colors are the same except for emission wavelengths of the semiconductor lasers, and thus, in the following description, the B light source 100B, the G light source 100G, and the R light source 100R will be simply described as the light source 100 without being distinguished for each color light.

Laser Module

Figure 2A:
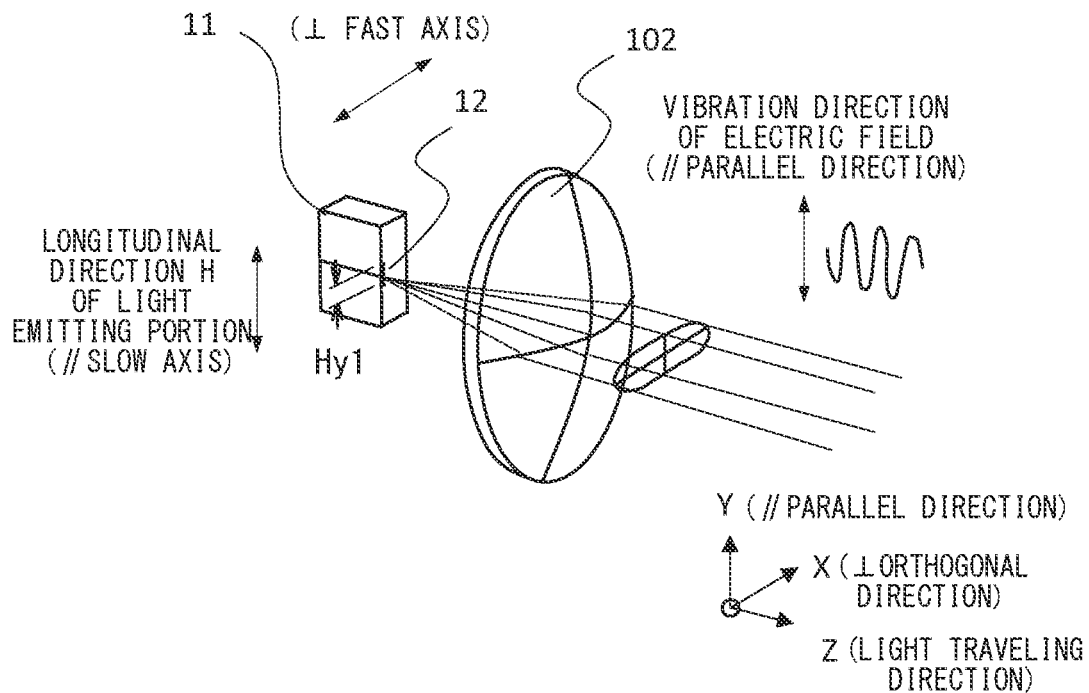
FIG. 2A is a schematic view illustrating one pair of a semiconductor laser and a collimating lens included in a laser module LM.

The light source 100 includes a laser module LM in which pairs of semiconductor lasers and collimating lenses are arranged in a one-dimensional or two-dimensional array. FIG. 2A is a schematic view illustrating one pair of the semiconductor laser and the collimating lens included in the laser module LM. Reference Sign 11 denotes the semiconductor laser, and Reference Sign 12 denotes a light emitting portion of the semiconductor laser 11. In FIG. 2A, the orientation of an XYZ coordinate system is displayed in accordance with the arrangement of the B light source 100B in FIG. 1. In FIG. 2A, a longitudinal direction H of the light emitting portion 12 is parallel to a Y direction, and a traveling direction of light emitted from the light emitting portion 12 is parallel to a Z direction.

The longitudinal direction H of the light emitting portion 12 is typically a direction in which an active layer sandwiched between a P-type cladding layer and an N-type cladding layer extends on a side surface of a semiconductor chip included in the semiconductor laser 11. As illustrated in FIG. 2A, in the following description, a direction parallel to the longitudinal direction H of the light emitting portion 12 of the semiconductor laser 11 may be referred to as a "parallel direction" or a slow axis, and a direction orthogonal to the longitudinal direction of the light emitting portion 12 may be referred to as an "orthogonal direction" or a fast axis. The semiconductor laser 11 emits linearly polarized light, and a vibration direction of an electric field thereof is the parallel direction (Y direction).

Figure 3A:
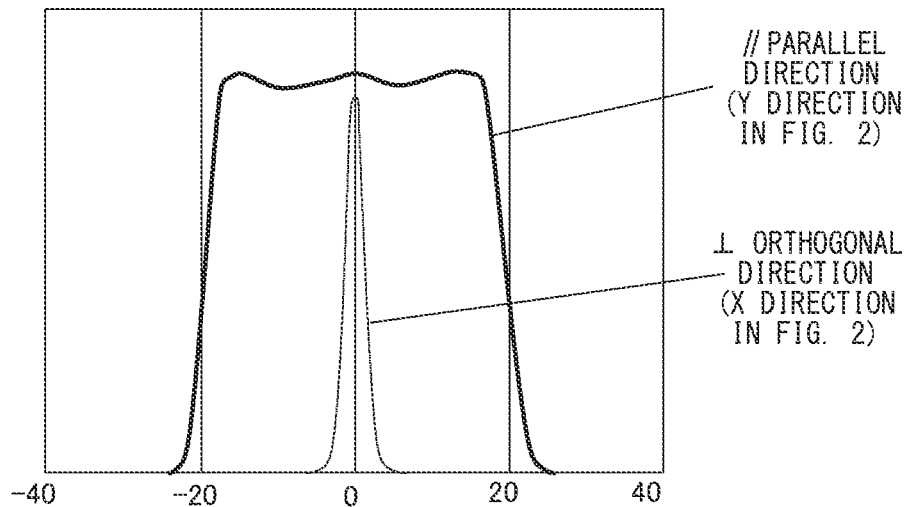
FIG. 3A is a diagram illustrating a near-field pattern of output light of the semiconductor laser 11.
Figure 3B:
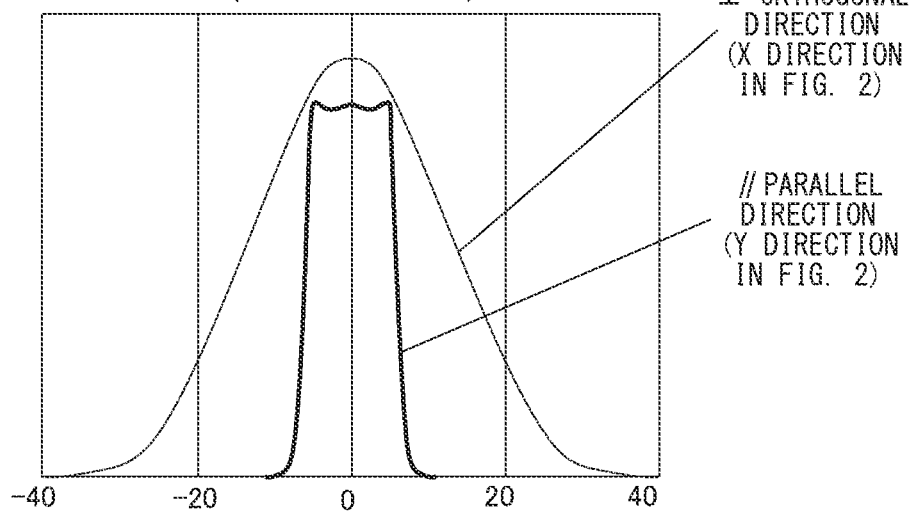
FIG. 3B is a diagram illustrating a far-field pattern of the output light of the semiconductor laser 11.

It is known that an angle characteristic (divergence) of output light of the semiconductor laser 11 vanes depending on an emission direction, and FIG. 3A illustrates a near-field pattern of the output light, and FIG. 3B illustrates a far-field pattern of the output light.

As illustrated in FIG. 3A, in the near-field pattern, a beam profile depends on the shape of the light emitting portion (in the longitudinal direction and a transverse direction). On the other hand, as a beam travels, the beam spreads as illustrated in the far-field pattern in FIG. 3B. That is, when viewed in the parallel direction, it can be seen that a beam emitted from the semiconductor laser 11 spreads a little and travels in a pattern with a uniform intensity distribution within a narrow angular range. On the other hand, when viewed in the orthogonal direction, it can be seen that a beam emitted from the semiconductor laser 11 has a pattern (Gaussian) in which an intensity distribution has a mountain shape, and spreads in a wider angular range than in the parallel direction as the beam travels. This is because the active layer of the semiconductor laser has a small thickness in the orthogonal direction, and thus is greatly affected by diffraction at the time of emission. In the far-field pattern, the parallel direction in which the spread is small can be referred to as the slow axis, and the orthogonal direction in which the spread is large can be referred to as the fast axis.

In the present embodiment, as illustrated in FIG. 2A, a laser beam emitted from the semiconductor laser 11 is formed using the collimating lens 102 (first collimating lens). That is, light emitted from the light emitting portion 12 whose length in the longitudinal direction is Hy1 is collimated by the collimating lens 102, and travels in the Z direction as a beam having an elliptical cross section. A major axis of the elliptical shape is parallel to the X direction, and a minor axis thereof is parallel to the Y direction.

Figure 4A:
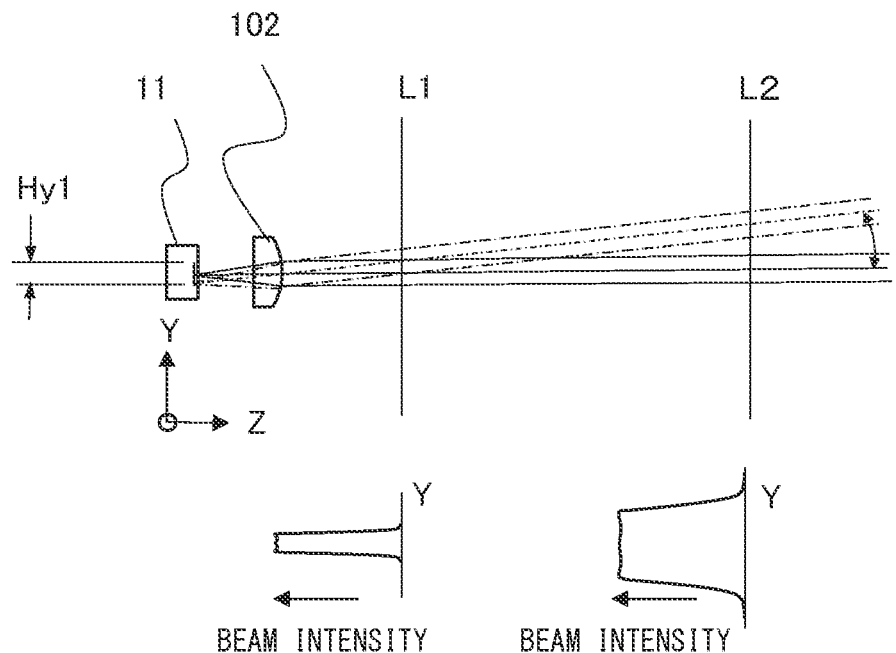
FIG. 4A is a view illustrating a spread of a beam in a parallel direction.
Figure 4B:
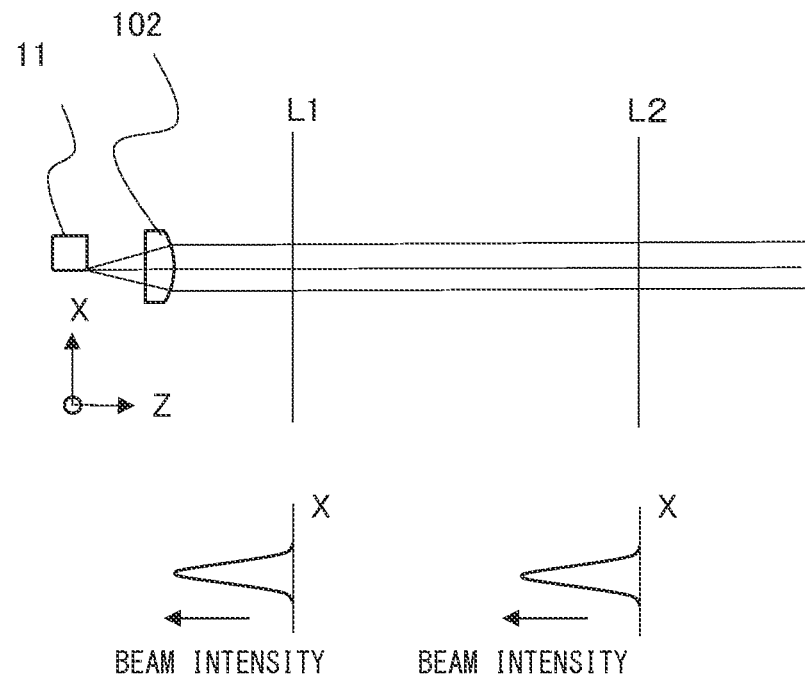
FIG. 4B is a view illustrating a spread of a beam in an orthogonal direction.

Even after passing through the collimating lens 102, the beam is not completely parallel to the optical axis (Z direction), and the spread of the beam differs between the parallel direction (the longitudinal direction of the light emitting portion) and the orthogonal direction (the transverse direction of the light emitting portion). A difference in spread of the beam after passing through the collimating lens 102 will be described with reference to FIGS. 4A and 4B. FIG. 4A illustrates the spread in the parallel direction, and FIG. 4B illustrates the spread in the orthogonal direction.

As illustrated in FIG. 4A, when viewed in the parallel direction, the top of the beam intensity distribution is flat, but a beam diameter increases as the beam travels in the Z direction, so that it cannot be said that the beam has a favorable divergence. On the other hand, as illustrated in FIG. 4B, when viewed in the orthogonal direction, it can be seen that changes in the beam intensity distribution and the beam diameter are small even when a distance from the collimating lens 102 changes. That is, the laser beam transmitted through the collimating lens 102 has a higher parallelism in the orthogonal direction (the fast axis of the semiconductor laser) than in the parallel direction (the slow axis of the semiconductor laser) and thus has a favorable divergence.

As described below, in the present invention, a beam is used for deflection-scanned in the orthogonal direction to illuminate the optical modulation element by utilizing the property that a divergence of a beam output from the light source 100 is excellent (the parallelism of the beam is high)

in the orthogonal direction (the transverse direction of the rectangular shape). This is because performing deflection-scanning by the beam in a direction in which the divergence is excellent is advantageous in preventing overlapping between the respective color illumination regions of B, G, and R on the screen of the optical modulation element.

Figure 2B:
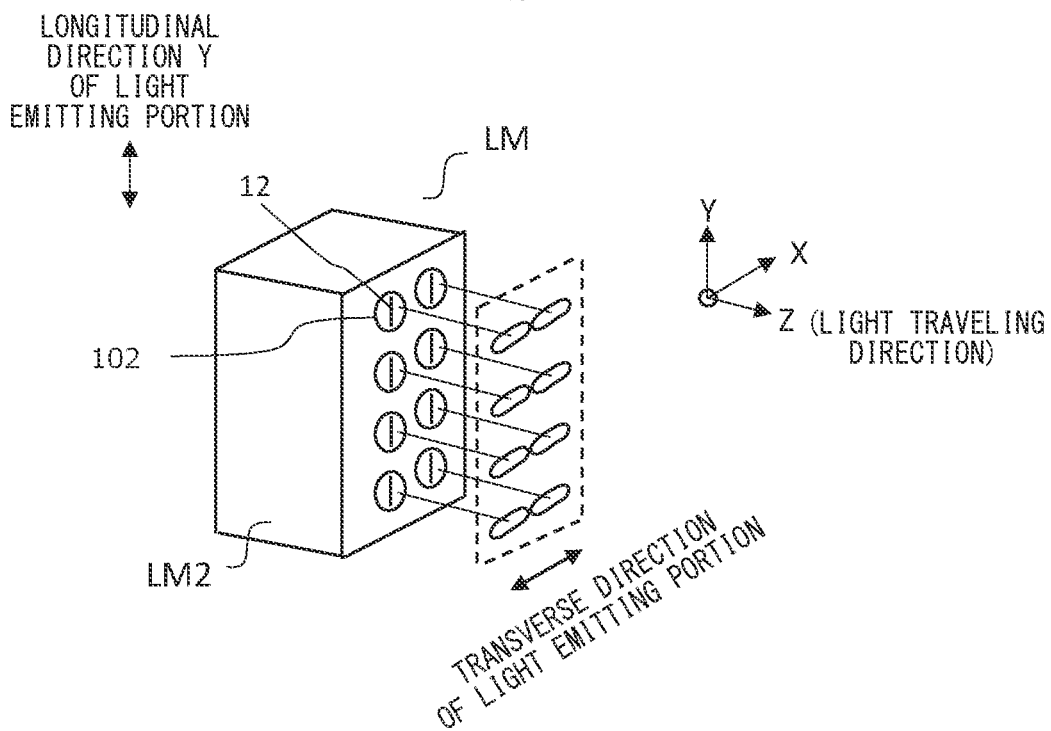
FIG. 2B is a schematic view illustrating the laser module LM in which 4×2 pairs of semiconductor lasers 11 and collimating lenses 102 are arranged.

The light source 100 includes the laser module LM including a plurality of pairs of the semiconductor lasers and the collimating lenses 102 (first collimating lenses). FIG. 2B is a schematic view illustrating a laser module LM in which 4×2 pairs of the semiconductor lasers 11 and the collimating lenses 102 are arranged. In FIG. 2B, the orientation of the XYZ coordinate system is displayed in accordance with the B light source 100B in FIG. 1.

In the laser module LM, a plurality of semiconductor lasers is arranged at equal intervals in the Y direction. In addition, all the semiconductor lasers are arranged in such a way that the longitudinal direction of the light emitting portion 12 is along the Y direction. Although an example using semiconductor lasers of 4×2 elements will be described, the number of elements is not limited to this example. The laser module LM may have a configuration in which a plurality of semiconductor lasers is arranged in only one row or in three or more rows in the Y direction. Even in the light source 100 including one or three or more element rows of semiconductor lasers in the Y direction, the output beam has a more favorable divergence in the transverse direction of the light emitting portion than in the longitudinal direction.

Integrator Illumination System/Optical Overlapping Means

The light source 100 of the present embodiment includes an integrator illumination system INT for overlapping a plurality of laser beams emitted from the laser module LM to form a rectangular illumination region. The integrator illumination system INT will be described with reference to FIGS. 5A to 5D.

The laser beams emitted from the respective semiconductor lasers 11 included in the laser module LM are approximately parallel by the function of the collimating lenses 102, but the divergence is as described above. The light source of the present embodiment includes the integrator illumination system INT that overlaps laser beams emitted from the respective semiconductor lasers in order to form a rectangular irradiation region IM1 illustrated in FIG. 5D.

Figure 5A:
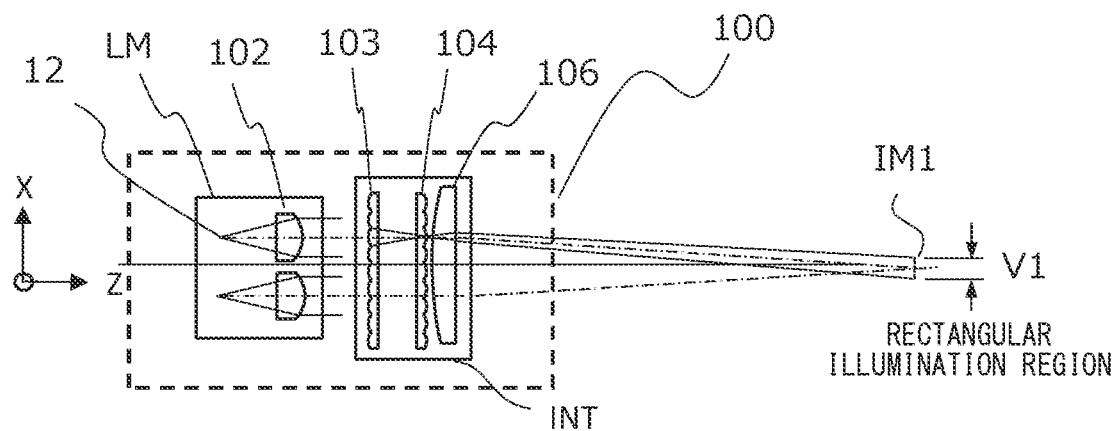
FIG. 5A is a view of an integrator illumination system INT as viewed from one direction.
Figure 5B:
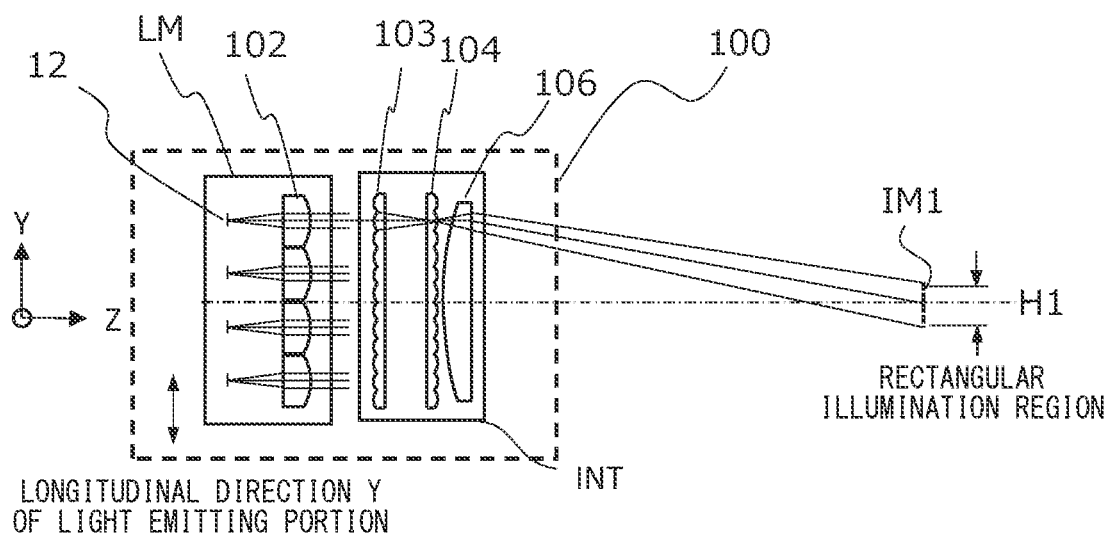
FIG. 5B is a view of the integrator illumination system INT as viewed from a direction orthogonal to that in FIG. 5A.

As illustrated in FIGS. 5A and 5B, the integrator illumination system INT includes a microlens array 103, a microlens array 104, and a condenser lens 106. The microlens array 103 and the microlens array 104 are formed in pairs.

Figure 5C:
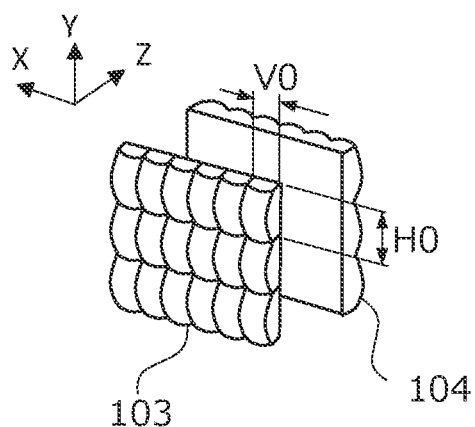
FIG. 5C is a view illustrating a pair of microlens arrays.

As illustrated in FIG. 5C, in each microlens array, microlenses of which a size in the X direction is V0 and a size in the Y direction is H0 are two-dimensionally arranged along an XY plane when viewed in a laser beam traveling direction (the Z direction in FIG. 5C). An incident surface of each microlens of the microlens array 103 and an emission surface of each microlens of the microlens array 104 are spherical surfaces. In addition, an emission surface of each microlens of the microlens array 103 and an incident surface of each microlens of the microlens array 104 are flat surfaces. A focal length of each microlens of the microlens array 103 and a focal length of each microlens of the microlens array 104 are set in such a way that an image can be formed at a spherical surface position on the opposite side.

Figure 5D:
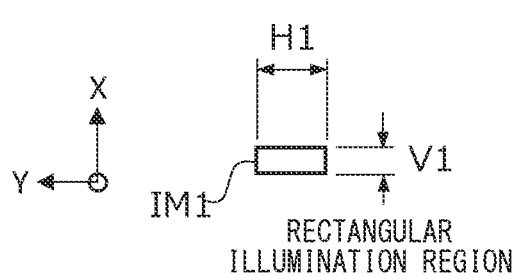
FIG. 5D is a view illustrating a rectangular irradiation region IM1.

The laser beam having passed through the microlens array 103 and the microlens array 104 is condensed by the condenser lens 106, and forms the rectangular irradiation region IM1 having a length V1 in the X direction and a length H1 in the Y direction as illustrated in FIG. 5D.

Since the semiconductor laser 11 achieves a more favorable divergence than a lamp light source or the like, for example, in a case where an interval at which the microlenses are arranged is within a range of 0.05 mm or more and 0.5 mm or less, the rectangular irradiation region IM1 whose V1 or H1 is about 1 mm to 2 mm can be obtained. The longitudinal direction of the rectangular irradiation region IM1 corresponds to the parallel direction (the slow axis direction of the semiconductor laser), and the transverse direction corresponds to the orthogonal direction (the fast axis direction of the semiconductor laser). The beam output from the light source 100 has a more favorable divergence in the transverse direction of the rectangular shape than in the longitudinal direction. In the present embodiment, a pair of microlens arrays in which microlenses each having a spherical surface and a flat surface are arranged in an array is adopted. However, in some cases, a pair of fly-eye lenses in which lenses of which both an incident surface and an emission surface are curved surfaces are arranged in an array may be used. Alternatively, in a case where alight source achieves a favorable a divergence (numerical aperture (NA) is small), a single-plate microlens array may be used instead of a pair of microlens arrays.

Deflector

As illustrated in FIG. 1, each deflector (the B deflector 210B, the G deflector 210G, and the R deflector 210R) is disposed between each light source 100 (the B light source 100B, the G light source 100G, and the R light source 100R) and the rectangular irradiation region IM1 irradiated by each light source 100.

The B deflector 210B, the G deflector 210G, and the R deflector 210R will be described. The B deflector 210B, the G deflector 210G, and the R deflector 210R serve as deflection elements used for deflection-scanning by laser beams of different colors. However, since the basic configurations thereof are the same, the B deflector 210B, the G deflector 210G, and the R deflector 210R may be described as the deflector 210 below without particularly specifying a color.

Figure 6A:
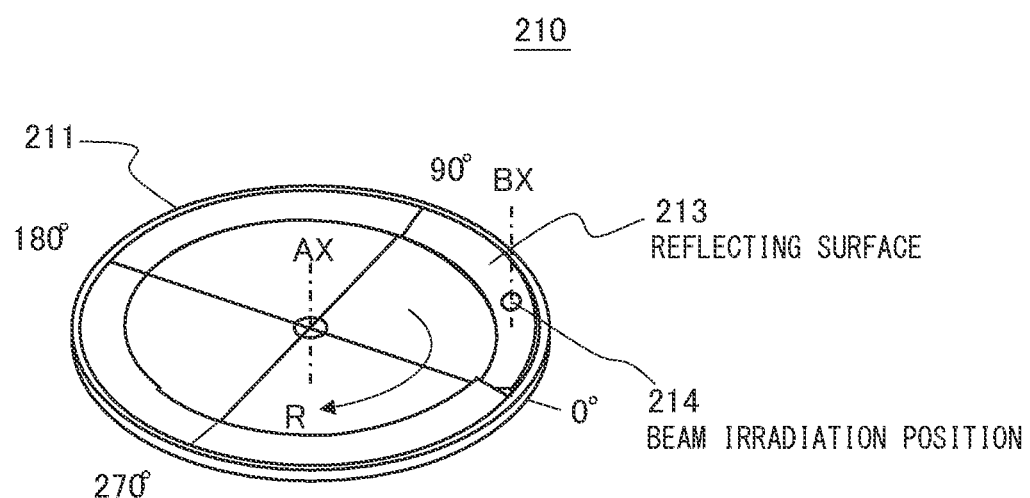
FIG. 6A is a perspective view illustrating an appearance of an example of a deflector 210.
Figure 6B:
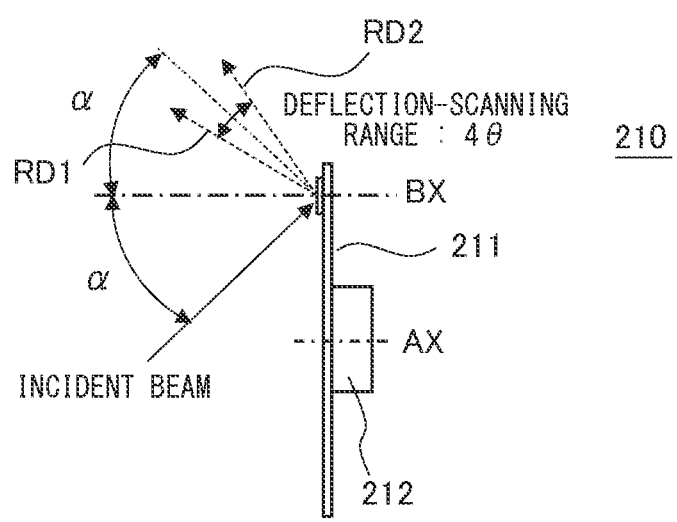
FIG. 6B is a side view of the deflector 210.

FIG. 6A is a perspective view illustrating an appearance of an example of the deflector 210, and FIG. 6B is a side view of the deflector 210.

The deflector 210 includes a rotatable disk-shaped base 211 and a motor 212 that rotates the base 211 around a rotation axis AX. A reflecting surface 213, which is a circular belt-shaped optical surface, is provided along a circumference of a main surface of the disk-shaped base 211. Here, an angular coordinate is set counterclockwise around the rotation axis AX as illustrated in FIG. 6A in order to specify the position of the reflecting surface (0° 90°, 180°, and 270° are illustrated in FIG. 6A). An axis BX illustrated in the drawings is an axis that is parallel to the rotation axis AX and passes through the reflecting surface 213. A beam position when a beam output from the light source 100 is reflected before reaching the rectangular irradiation region IM1 is illustrated as a beam irradiation position 214.

Figure 7A:
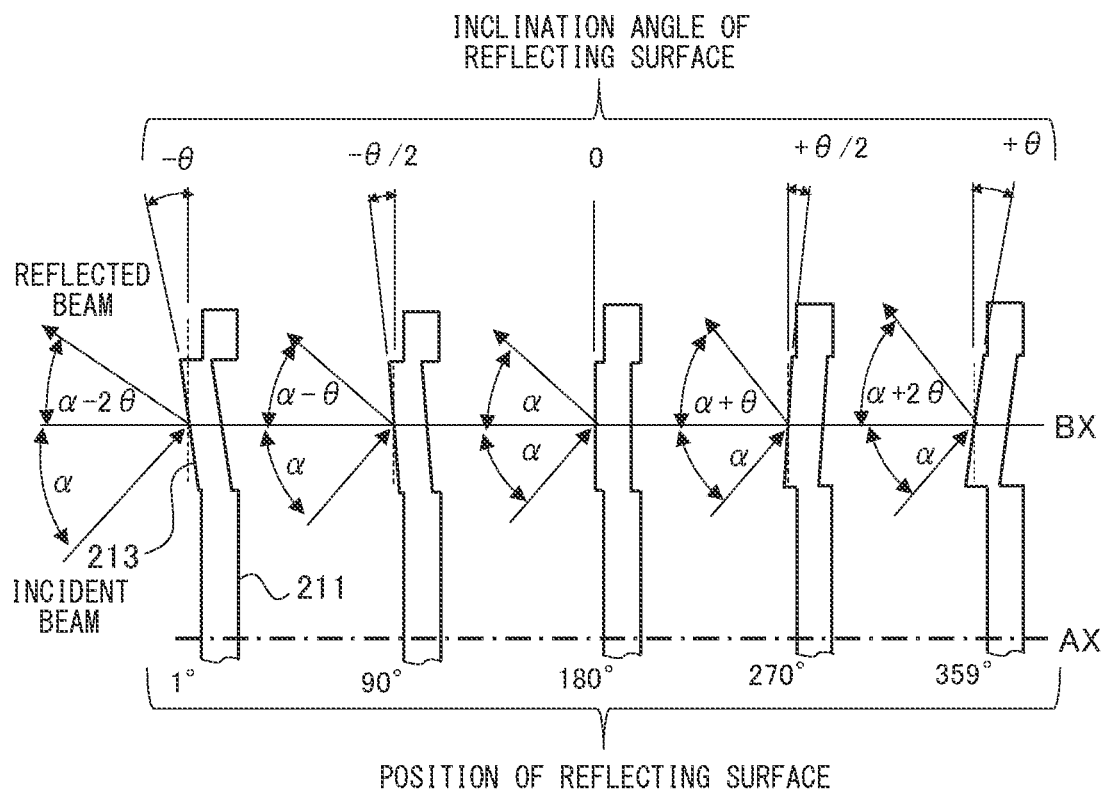
FIG. 7A is a cross-sectional view for describing a position and an inclination angle of a reflecting surface of the deflector 210.
Figure 7B:
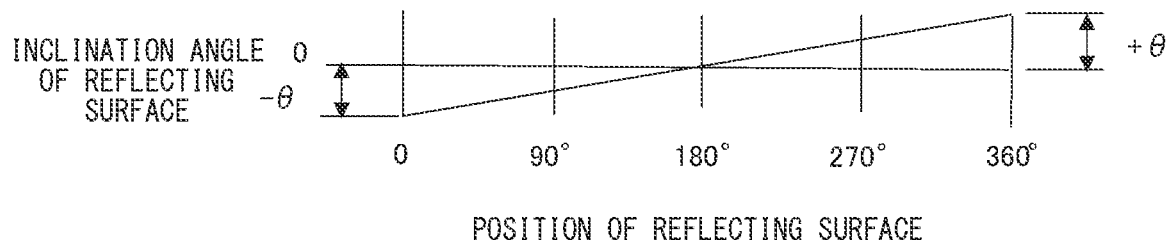
FIG. 7B is a graph for describing the position and the inclination angle of the reflecting surface of the deflector 210.

The circular belt-shaped reflecting surface 213 is twisted in such a way that an angle with respect to the axis BX (that is, the rotation axis AX) changes depending on the position. The angle of the reflecting surface will be described with reference to FIGS. 7A and 7B. In FIGS. 7A and 7B, a position defined by the angular coordinate described in FIG. 6A is illustrated as the position of the reflecting surface. In addition, an inclination angle of the reflecting surface with respect to the main surface of the disk-shaped base 211 (that is, a surface orthogonal to the axis BX) is illustrated as an inclination angle of the reflecting surface.

As illustrated in FIG. 7B, the reflecting surface 213 is configured in such a way that the inclination angle of the reflecting surface changes linearly with respect to the position of the reflecting surface. As illustrated in FIGS. 6A and 7B, the inclination angle of the reflecting surface is discontinuous when the position of the reflecting surface is 0° (360°), and thus, FIG. 7A illustrates the inclination angles in a case where the position of the reflecting surface is 1° and 359° for convenience of description.

As the base 211 rotates in an R direction by the motor, the reflecting surface 213 also rotates around the rotation axis AX, and thus, the angular coordinate of a portion irradiated with the laser beam at the beam irradiation position 214 illustrated in FIG. 6A continuously changes as follows: 0°→90°→180°→360° (=0°)→90°→ . . . .

Even if the portion of the reflecting surface irradiated with the laser beam changes as the reflecting surface rotates, the incident beam is always incident on the reflecting surface 213 at an angle of α with respect to the axis BX as illustrated in FIG. 7A. On the other hand, the inclination angle of the reflecting surface changes in a range of −θ to +θ according to the position of the reflecting surface. Therefore, as illustrated in FIG. 7A, a direction of the laser beam reflected by the reflecting surface 213 changes within an angular range of 4θ from (α−2×θ) to (α+2×θ) with respect to the axis BX. That is, the inclination angle is formed in such a way that as to recursively deflect the laser beam in a constant direction at a constant deflection speed, as the optical surface (reflecting surface) continuously rotates at a constant speed.

In other words, as illustrated in FIG. 6B, the deflector 210 can perform deflection-scanning by an emitted beam within an angular range from RD1 ((α−2×θ) with respect to the axis BX) to RD2 ((α+2×θ) with respect to the axis BX). As the reflecting surface 213 continuously rotates in the R direction in FIG. 6A, the emitted beam is continuously deflected (used for scanning) from RD1 toward RD2 in FIG. 6B, and once RD2 is reached, the emitted beam instantaneously returns to RD1 and is deflected (used for scanning) toward RD2 again. In addition, if the reflecting surface 213 rotates in a direction opposite to the R direction, the emitted beam is continuously deflected (used for scanning) from RD2 toward RD1 in FIG. 6B, and once RD1 is reached, the emitted beam instantaneously returns to RD2 and is deflected (used for scanning) toward RD1 again.

As described above, with the deflector 210, a laser beam can be used recursively for deflection-scanning in a predetermined direction at a constant speed by a simple driving method of continuously rotating a rotary member at a constant speed. As will be described below, illumination light can be used for scanning in a V direction on the screen of the reflective optical modulation element 340 by controlling the motor 212 to rotate in synchronization with a drive timing of the reflective optical modulation element 340, alternatively, an image signal input timing to the reflective optical modulation element 340.

In carrying out the present invention, a galvanometer mirror may be used instead of the deflector 210 including the rotary member. However, it is desirable to use the deflector 210 including the rotary member, since in a case of using the galvano mirror, an increase in device size, generation of vibration, an increase in costs, and the like are expected.

Figure 8A:
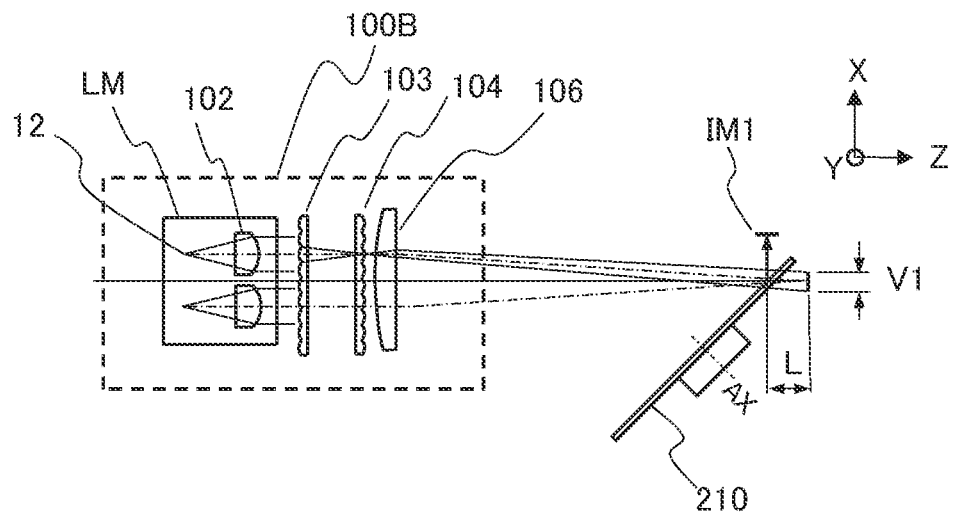
FIG. 8A is a view illustrating a positional relationship between the deflector 210 and the rectangular irradiation region IM1.
Figure 8B:
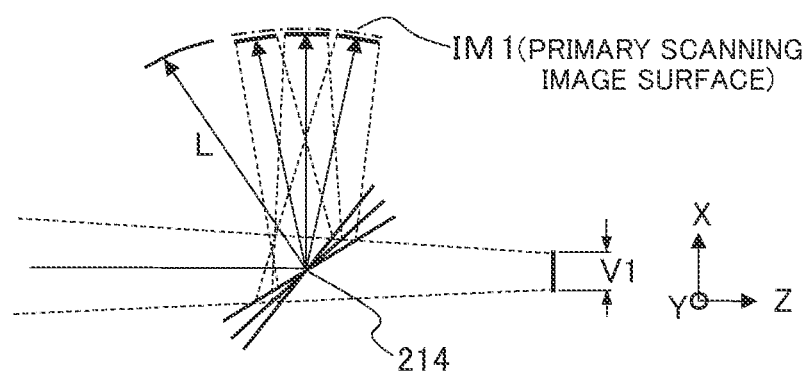
FIG. 8B is an enlarged view of the vicinity of a beam irradiation position 214 on the reflecting surface.
Figure 8C:
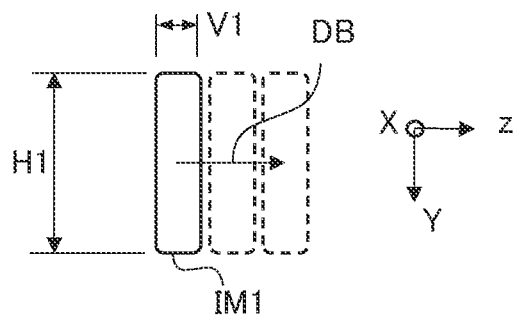
FIG. 8C is a view illustrating that the blue rectangular irradiation region IM1 is deflection-scanned in a DB direction.

FIG. 8A illustrates a positional relationship between the deflector 210 and the rectangular irradiation region IM1. The coordinate system is illustrated based on the B light source 100B. FIG. 8B is an enlarged view of the vicinity of the beam irradiation position 214 on the reflecting surface. The beam irradiation position 214 on the reflecting surface is disposed more toward the light source side than the rectangular irradiation region IM1 by a distance L. As illustrated in FIG. 8C, the blue rectangular irradiation region IM1 is deflection-scanned in the DB direction in response to the rotation of the deflector 210.

The method for manufacturing the deflector 210 will be more specifically described below. The disk-shaped base 211 in which the circular belt-shaped reflecting surface 213 is provided along the circumference can be manufactured at low cost by processing a metal base material by, for example, a press extrusion method. As illustrated in FIG. 7A, there is a portion protruding from the main surface of the base 211 or a portion recessed from the main surface in the vicinity of the reflecting surface 213, but in order to improve a rotation balance, it is desirable to form a shape having the same cross-sectional area at any cross section passing through the rotation axis AX. In addition, the maximum height from the main surface of the base 211 and the maximum depth from the main surface are desirably ¾ or less of an average plate thickness in order to reduce wind noise. Specifically, the average plate thickness of the base 211 is desirably 0.7 mm or more and 2 mm or less, and θ is desirably 3° or more and 60 or less.

With the deflector described above, the rectangular irradiation regions IM1 of the respective colors formed by the B, G, and R laser beams are deflection-scanned in the DB direction, the DG direction, and the DR direction, respectively, as illustrated in FIG. 1.

Light Combining Unit

All the laser beams of the respective colors travel in the same direction by the light combining unit 220, and the function of the light combining unit 220 is already described in the section of the overall configuration.

Transfer Optical System

The rectangular irradiation region IM1 formed by the laser beam of each color is enlarged and transferred to the screen of the reflective optical modulation element 340 by first transfer lenses 200 (first transfer optical system) including the front transfer lens 201 for each color and the rear transfer lens 202. Each of the front transfer lens 201 and the rear transfer lens 202 is a convex lens having positive power.

Figure 9A:
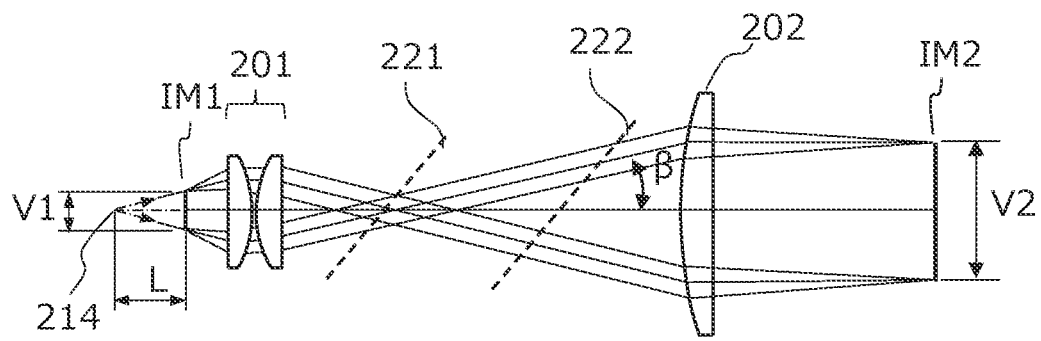
FIG. 9A is a schematic view for describing functions of a front transfer lens 201 and a rear transfer lens 202.

FIG. 9A is a schematic view for describing the functions of the front transfer lens 201 and the rear transfer lens 202. As illustrated, the rectangular irradiation region IM1 is enlarged and transferred as a rectangular secondary transfer image IM2. As illustrated in FIG. 1, the rectangular secondary transfer image IM2 is set at the screen position of the reflective optical modulation element 340. A transfer magnification at which the rectangular irradiation region IM1 is enlarged to the rectangular secondary transfer image IM2 is, for example, about six times (V1:V2=1:6).

Figure 9B:
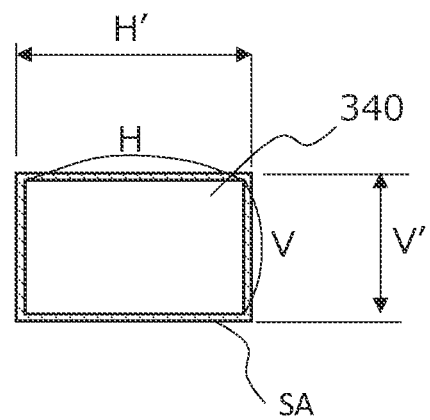
FIG. 9B is a view illustrating a relationship between a screen of a reflective optical modulation element 340 and a rectangular laser beam scanning range SA.

FIG. 9B illustrates a relationship between the screen of the reflective optical modulation element 340 and a rectangular laser beam scanning range SA. In a case where the size of the screen of the reflective optical modulation element 340 is H (horizontal direction)×V (vertical direction), the rectangular laser beam scanning range SA covers a region of H'×V' larger than the screen size. The rectangular laser beam scanning range SA is enlarged at the transfer magnification described above with respect to a scanning range in which the rectangular irradiation region IM1 is scanned by the deflector 210.

Figure 9C:
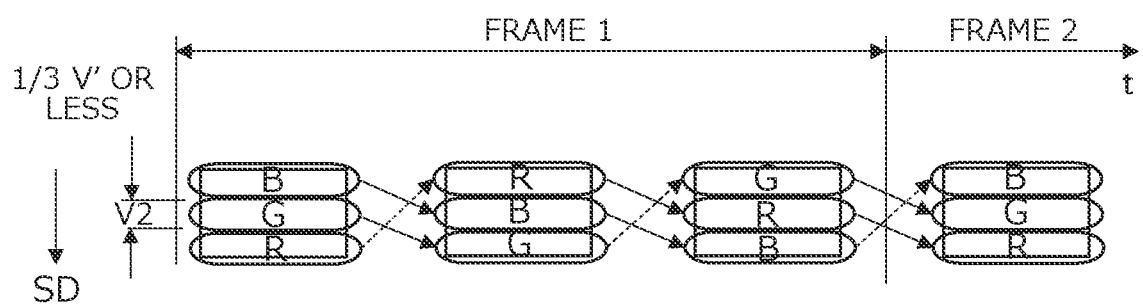
FIG. 9C is a view illustrating a state in which the screen of the reflective optical modulation element 340 is irradiated with each of a rectangular B beam, a rectangular G beam, and a rectangular R beam with a horizontal axis as a time axis.

FIG. 9C is a view illustrating a state in which the screen of the reflective optical modulation element 340 is irradiated with each of the rectangular B beam, the rectangular G beam, and the rectangular R beam with a horizontal axis as a time axis. The B beam, the G beam, and the R beam are vertically used to scan the screen of the reflective optical modulation element 340 in a scanning direction SD, and scanning of one screen is completed within one frame. The B beam, the G beam, and the R beam are configured not to overlap each other to prevent color mixing at a boundary portion between the respective color regions, and a width V2 of each beam in the vertical direction is inevitably ⅓ or less of V'. The width of each beam in the vertical direction can be set to ⅙ or more and ⅓ or less of the width of the screen of the reflective optical modulation element 340 in the vertical direction.

As described above, in the projection display device according to the present embodiment, an illumination unit including the plurality of semiconductor lasers, collimating lens, the integrator illumination system, and the deflection element is provided for each of different color lights, the projection display device includes the light combining unit that combines illumination lights output from the illumination units for the different color lights, and the rectangular illumination regions output from the respective illumination units for the different color lights are enlarged and transferred to the reflective optical modulation element while being deflection-scanned in such a way as not to overlap each other.

According to the present embodiment, in the field of the projection image display device that modulates and projects laser light according to an image signal, it is possible to implement a compact device for which driving control is easy and which has a high light use efficiency.

Second Embodiment

Figure 10:
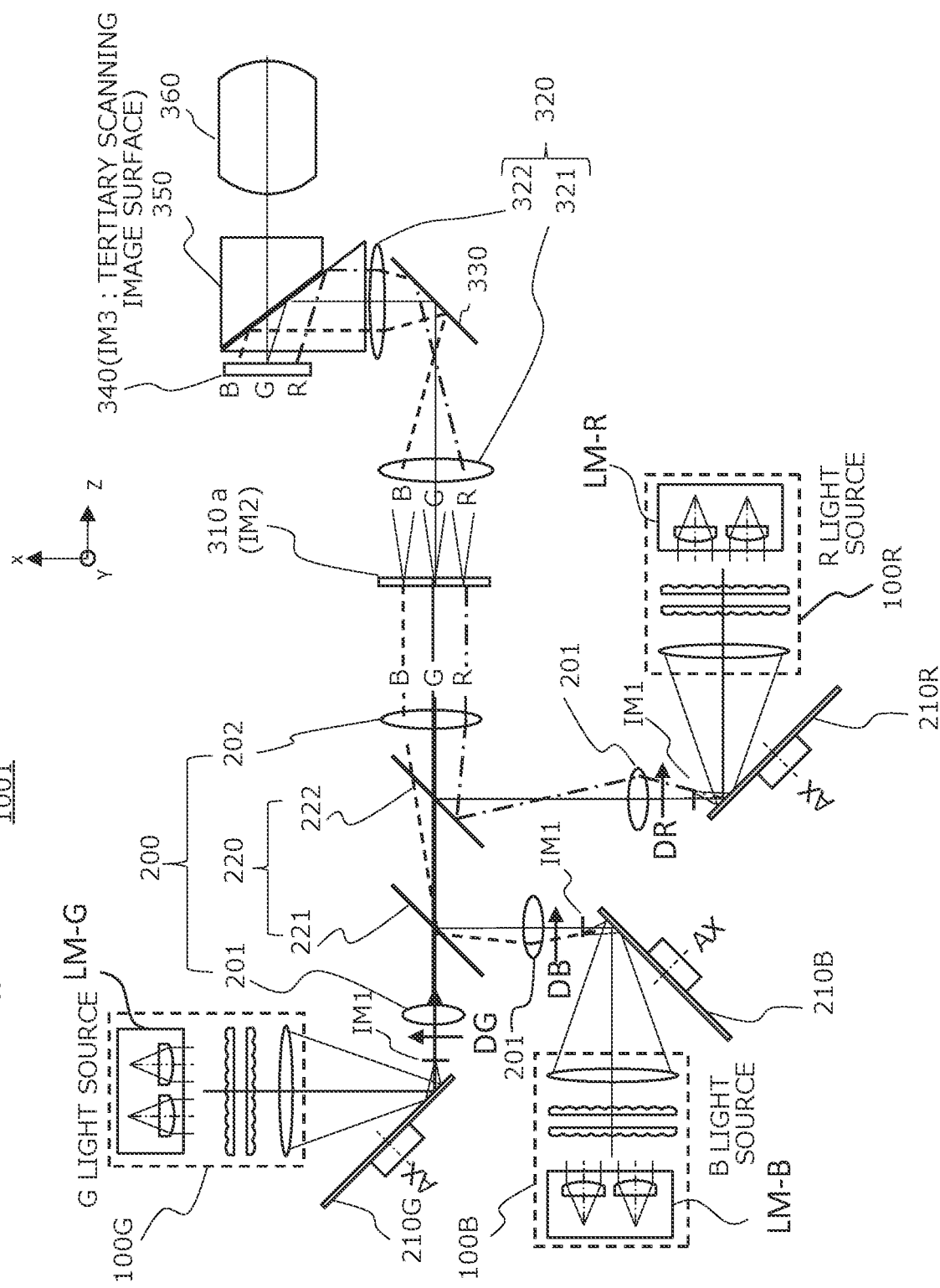
FIG. 10 is a view illustrating a schematic configuration of an optical system of a projection display device according to a second embodiment.

FIG. 10 is a view illustrating a schematic configuration of an optical system of a projection display device according to a second embodiment. For convenience of description, a mechanical mechanism for installing an optical element, a casing, electrical wiring, and the like are omitted in the drawing. A description of matters common to the first embodiment will be simplified or omitted.
Overall Configuration A projection display device 1001 of the present embodiment is the same as that of the first embodiment in that the projection display device 1001 includes a B light source 100B, a G light source 100G, an R light source 100R, a B deflector 210B, a G deflector 210G, an R deflector 210R, first transfer lenses 200 including a front transfer lens 201 and a rear transfer lens 202, a light combining unit 220, an optical path conversion mirror 330, a TIR prism 350, a reflective optical modulation element 340, and a projection lens 360.

According to the present embodiment, the projection display device 1001 further includes a diffusion plate 310a disposed between the rear transfer lens 202 and the optical path conversion mirror 330, and a second transfer optical system 320 including a front transfer lens 321 and a rear transfer lens 322 disposed with the optical path conversion mirror 330 interposed therebetween.

The first transfer lenses 200 according to the first embodiment enlarge and transfer the rectangular irradiation region IM1 to the screen of the reflective optical modulation element 340, but the first transfer lenses 200 (first transfer optical system) according to the present embodiment forms a secondary transfer image IM2 at a position of the diffusion plate 310a. Then, the secondary transfer image IM2 scattered by the diffusion plate 310a is enlarged and transferred as a tertiary transfer image IM3 to a screen of the reflective optical modulation element 340 by the second transfer optical system 320 (second transfer optical system). The size of each image is typically set in the following relationship.

IM1:IM2:IM3=1:2:6

According to the present embodiment having such a configuration, it is easy to control the F-number of illumination light for illuminating the reflective optical modulation element 340.

In FIG. 10, the diffusion plate 310a is fixed at a fixed position. However, for example, an irradiation position of a laser beam on the diffusion plate may be moved over time by rotating or linearly reciprocating the diffusion plate. With such a form, scintillation of illumination light by a laser can be suppressed.

According to the present embodiment, in the field of the projection image display device that modulates and projects laser light according to an image signal, it is possible to implement a compact device for which driving control is easy and which has a high light use efficiency.

Third Embodiment

In the first and second embodiments, the light source includes the integrator illumination system INT for overlapping a plurality of laser beams emitted from the laser module LM to form a rectangular illumination region. The present embodiment is the same as the first and second embodiments in that an integrator illumination system INT for forming a rectangular illumination region is provided, but the present embodiment is different from the first and second embodiments in that the integrator illumination system of the first and second embodiments includes the microlens array, whereas the integrator illumination system of the present embodiment includes a rod integrator. A description of matters common to the first embodiment will be simplified or omitted.

FIG. 11 is a view for describing a light source according to the third embodiment, that is, the integrator illumination system including a rod integrator. The integrator illumination system according to the present embodiment includes a laser module LM, a condenser lens 401, a diffusion element 402, a rod 403, and a relay lens 406, and forms a rectangular irradiation region IM1. A semiconductor laser included in the laser module LM, alight emitting portion 12 of the semiconductor laser, a collimating lens 102, and the like are similar to those in the first embodiment described with reference to FIGS. 2A to 4B, and thus a description thereof is omitted here.

Laser beams emitted from the respective semiconductor lasers included in the laser module LM are approximately parallel by the function of the collimating lenses 102, but the divergence is as described above. The substantially collimated laser beam output from the laser module LM is condensed toward an incident surface INP of the rod 403 by the condenser lens 401. In the drawing, the condenser lens 401 is illustrated as one convex lens. However, the condenser lens 401 may be implemented by a plurality of lenses for the purpose of suppressing aberration or the like.

The diffusion element 402 is disposed in the vicinity of the incident surface INP of the rod 403, and a laser beam diffused by the diffusion element 402 is incident on the rod 403 through the incident surface INP. Since a divergence of a beam output from the laser module LM is more favorable in the transverse direction of the rectangular shape than in the longitudinal direction, it is possible to suppress a light capturing loss on the incident surface INP of the rod 403 and to improve utilization efficiency. The light incident on the rod 403 is emitted from an emission surface EXP after repeating total reflection on a side surface of the rod 403, but luminance distribution on the emission surface EXP can be made uniform by appropriately setting diffusing power (diffusion angle) of the diffusion element 402 and the length of the rod 403.

The rectangular irradiation region IM1 in which luminance distribution is highly uniform can be obtained by transferring an image emitted from the emission surface EXP of the rod 403 by relay lenses 406. It is possible to obtain the irradiation region IM1 of a desired size by appropriately setting a transfer magnification of the relay lenses, the desired size being a reduced size, an equal size, or an enlarged size. In FIG. 11, the relay lenses 406 include two lenses, a front convex lens 406a and a rear convex lens 406b, but the configuration of the relay lenses 406 is not limited to this example.

Figure 12A:
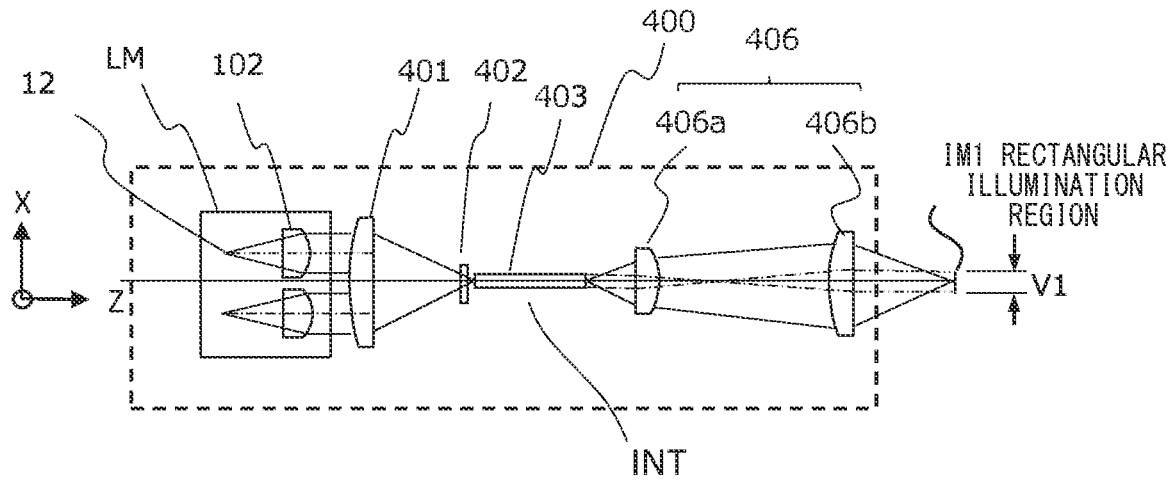
FIG. 12A is a view of an integrator illumination system INT according to the third embodiment as viewed from one direction.
Figure 12B:
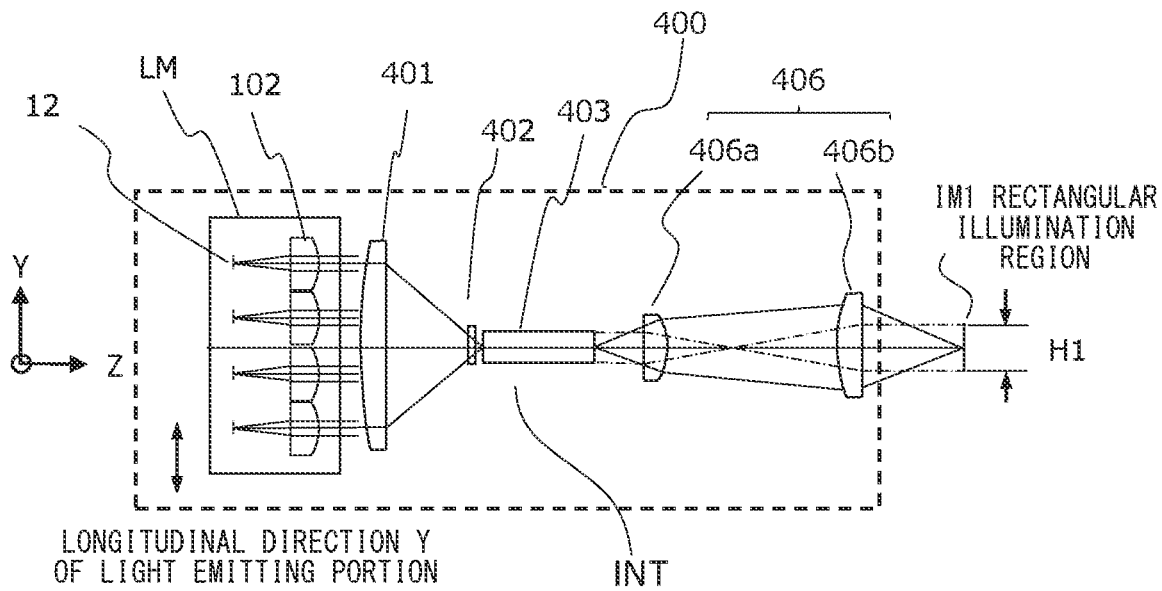
FIG. 12B is a view of the integrator illumination system INT according to the third embodiment as viewed from a direction orthogonal to that in FIG. 12A.

FIG. 12A is a view illustrating a light source 400 including the integrator illumination system INT, in a direction in which the transverse direction (X direction) of the light emitting portion 12 of the semiconductor laser is visible. FIG. 12B is a view illustrating the light source 400 including the integrator illumination system INT, in a direction in which the longitudinal direction (Y direction) of the light emitting portion 12 of the semiconductor laser is visible.

Figure 13A:
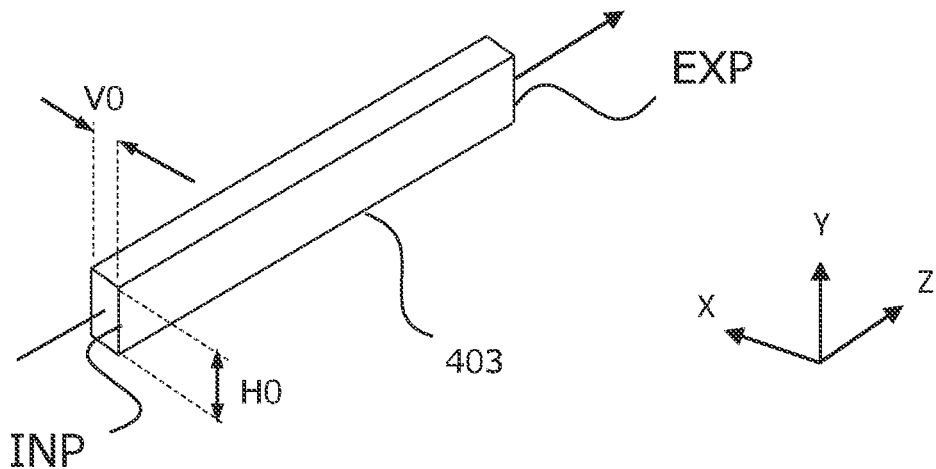
FIG. 13A is a view illustrating a bulk rod used in the integrator illumination system.
Figure 13B:
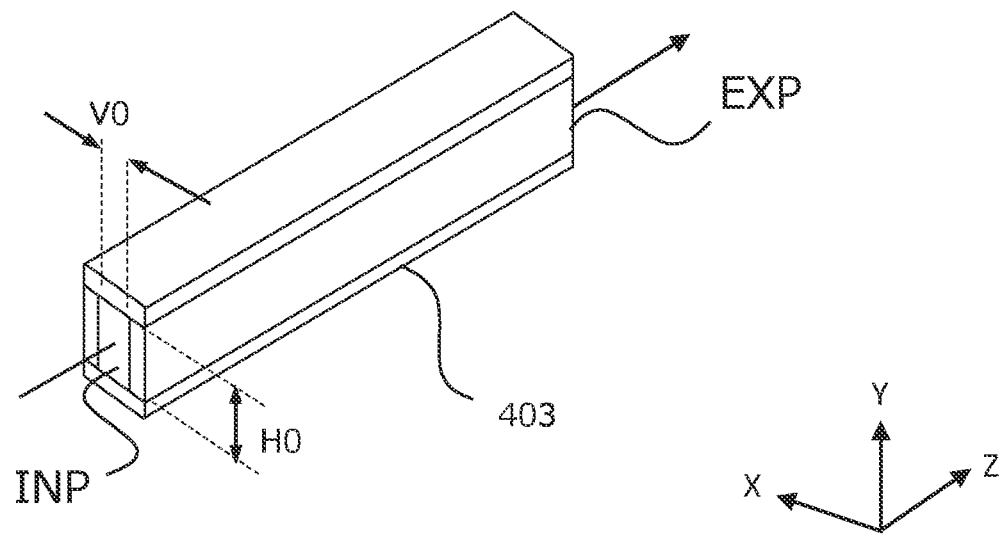
FIG. 13B is a view illustrating a hollow rod used in the integrator illumination system.

It is sufficient if the rod 403 is an optical element capable of totally reflecting incident light on a side surface thereof, and for example, an optical element illustrated in FIG. 13A or an optical element illustrated in FIG. 13B can be used. Preferably, the rod 403 is configured in such a way that the shape of the incident surface INP, the shape of the emission surface EXP, and the cross-sectional shape of a rod portion are the same.

The rod 403 illustrated in FIG. 13A is a solid quadrangular prism element formed of an optical material such as optical glass or a light-transmissive resin, and the shapes of the incident surface INP and the emission surface EXP, which are end surfaces, are rectangles with a long side being H0 and a short side being V0. It is desirable to apply an antireflection film (AR coating) to the incident surface INP and the emission surface EXP.

The rod 403 illustrated in FIG. 13B is a hollow quadrangular prism, that is, a tubular element, and a reflecting surface formed of, for example, aluminum is formed on an inner surface of the tubular element. The shapes of the incident surface INP and the emission surface EXP, which are opening portions of the tubular element, are rectangles with a long side being H0 and a short side being V0. For example, after a reflecting film such as an aluminum film is vapor-deposited on a glass or metal plate-like substrate, the substrate is bonded and assembled into a tubular shape, whereby the rod 403 can be manufactured at a relatively low cost.

Figure 12C:
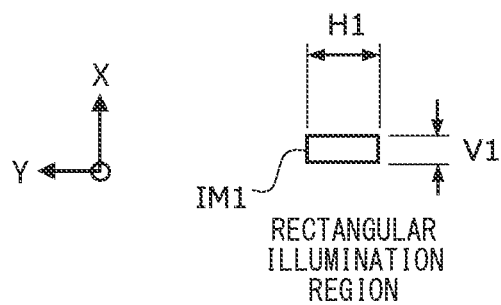
FIG. 12C is a view illustrating a rectangular irradiation region IM1.

The shapes of the incident surface INP and the emission surface EXP of the rod 403 are rectangles with the long side being H0 and the short side being V0 as described above, and the rectangular irradiation region IM1 with a long side being H1 and a short side being V1 illustrated in FIG. 12C is formed by the relay lenses 406. The long side of the rectangular irradiation region IM1 corresponds to the parallel direction (the slow axis direction of the semiconductor laser), and the short side corresponds to the orthogonal direction (the fast axis direction of the semiconductor laser). For example, if the shapes of the incident surface INP and the emission surface EXP of the rod 403 are rectangles of which a size in the X direction (short side V0) is 0.33 mm and a size in the Y direction (long side H0) is 1.67 mm, and the magnification of the relay lenses 406 is 1.2 times, the rectangular irradiation region IM1 of which V1 is about 0.4 mm and H1 is about 2 mm can be obtained.

Figure 14:
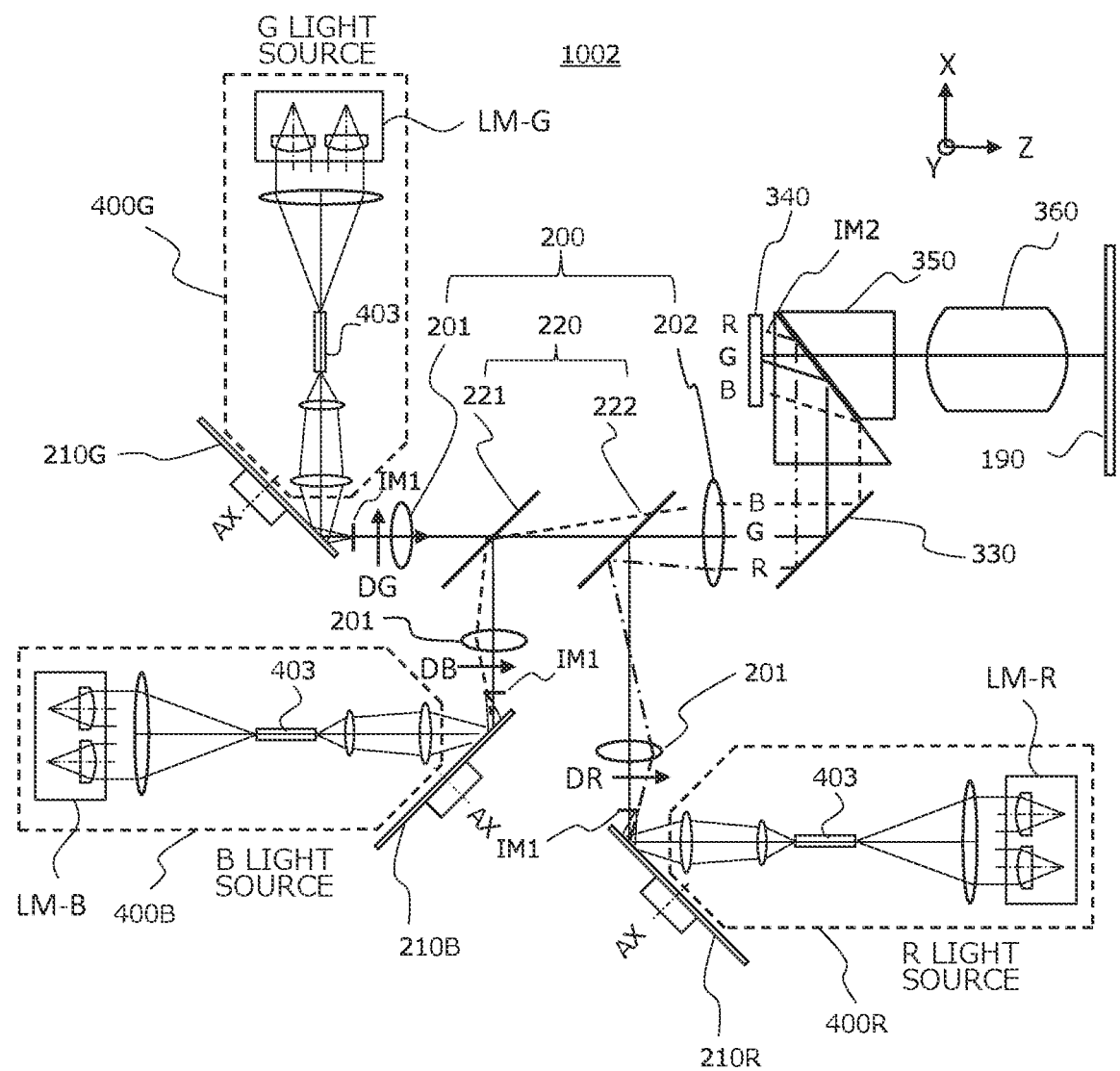
FIG. 14 is a view illustrating a schematic configuration of an optical system of a projection display device according to the third embodiment.

FIG. 14 illustrates a schematic configuration of an optical system of a projection display device 1002 according to the third embodiment. For convenience of description, a mechanical mechanism for installing an optical element, a casing, electrical wiring, and the like are omitted in the drawing. In the present embodiment, the B light source 100B, the G light source 100G, and the R light source 100R of the projection display device 1000 according to the first embodiment described with reference to FIG. 1 are replaced with a B light source 400B, a G light source 400G, and an R light source 400R using the rod integrator. A description of matters common to those of the projection display device 1000 according to the first embodiment will be omitted.

Figure 15:
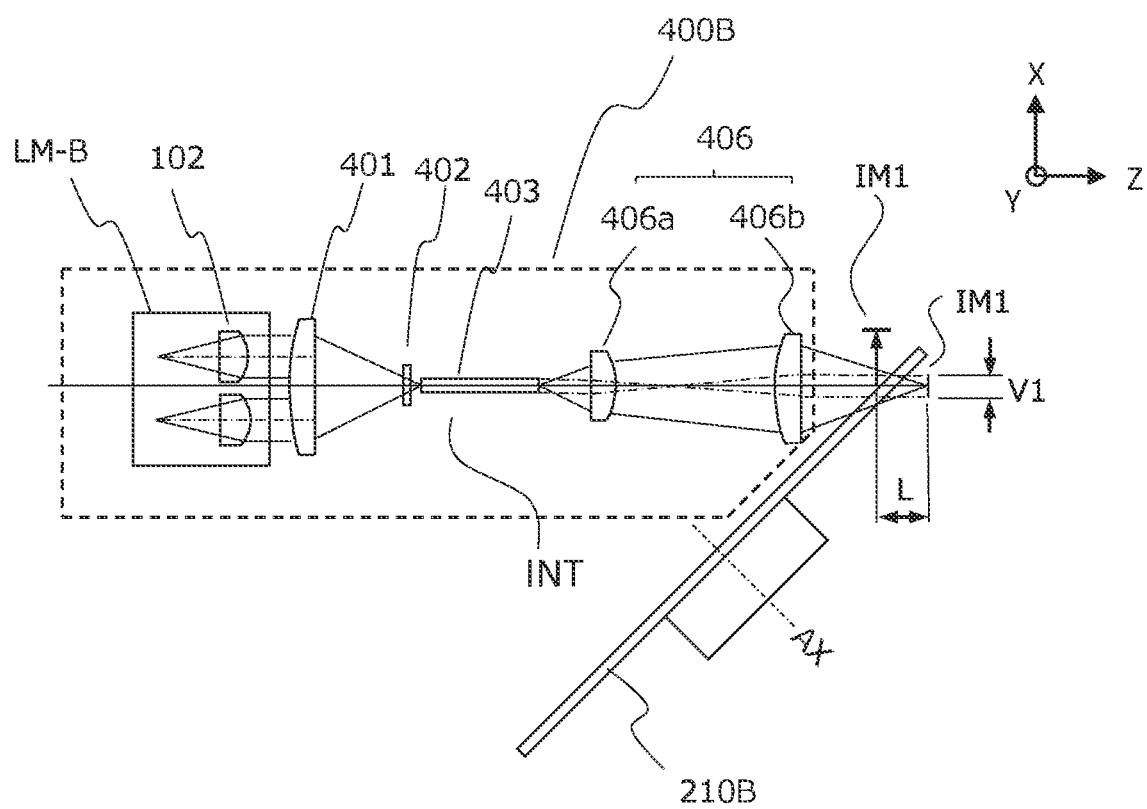
FIG. 15 is a view illustrating a positional relationship between a deflector and the rectangular irradiation region IM1 according to the third embodiment.

FIG. 15 is a view corresponding to FIG. 8A in the first embodiment, and illustrates a positional relationship between a deflector and the rectangular irradiation region IM1. The coordinate system is illustrated based on the B light source 400B.

In the projection display device according to the present embodiment, an illumination unit including the plurality of semiconductor lasers, collimating lens, the integrator illumination system, and the deflection element is provided for each of different color lights, the projection display device includes the light combining unit that combines illumination lights output from the illumination units for the different color lights, and the rectangular illumination regions output from the respective illumination units for the different color lights are enlarged and transferred to the reflective optical modulation element while being deflection-scanned in such a way as not to overlap each other.

According to the present embodiment, in the field of the projection image display device that modulates and projects laser light according to an image signal, it is possible to implement a compact device for which driving control is easy and which has a high light use efficiency.

Fourth Embodiment

FIG. 16 illustrates a schematic configuration of an optical system of a projection display device 1003 according to a fourth embodiment. For convenience of description, a mechanical mechanism for installing an optical element, a casing, electrical wiring, and the like are omitted in the drawing. In the present embodiment, the B light source 100B, the G light source 100G, and the R light source 100R of the projection display device 1001 according to the second embodiment described with reference to FIG. 10 are replaced with the Blight source 400B, the G light source 400G, and the R light source 400R using the rod integrator described in the third embodiment. A description of matters common to those of the projection display device 1001 according to the second embodiment will be omitted.

Similarly to the second embodiment, first transfer lenses 200 (first transfer optical system) of the present embodiment form a secondary transfer image IM2 at a position of a diffusion plate 310a. Then, the secondary transfer image IM2 scattered by the diffusion plate 310a is enlarged and transferred as a tertiary transfer image IM3 to a screen of a reflective optical modulation element 340 by a second transfer optical system 320 (second transfer optical system). The size of each image is typically set in the following relationship:

IM1:IM2:IM3=1:2:6

According to the present embodiment having such a configuration, it is easy to control the F-number of illumination light for illuminating the reflective optical modulation element 340.

In FIG. 16, the diffusion plate 310a is fixed at a fixed position. However, for example, an irradiation position of a laser beam on the diffusion plate may be moved over time by rotating or linearly reciprocating the diffusion plate. With such a form, scintillation of illumination light by a laser can be suppressed.

According to the present embodiment, in the field of the projection image display device that modulates and projects laser light according to an image signal, it is possible to implement a compact device for which driving control is easy and which has a high light use efficiency.

Other Embodiments

Note that the present invention is not limited to the embodiments described above, and many modifications can be made within the technical idea of the present invention.

For example, in the integrator illumination system INT, diffraction-type diffusion elements (so-called top hat elements) may be arranged instead of the microlens array 103 and the microlens array 104 forming a pair. As long as the top hat element has different diffusion angles in the X direction and the Y direction, it is not always necessary to provide two top hat elements, and one top hat element can be provided.

Alternatively, instead of the microlens array 103 and the microlens array 104 in which the microlenses having a spherical shape are two-dimensionally arranged, an array of striped microlenses (cylindrical lenses) in the X direction and an array of striped microlenses (cylindrical lenses) in the Y direction may be independently provided. With such a configuration, since the focal length and the interval between the arrays can be set regardless of the interval between the stripes, it is possible to suppress instability in capturing due to an insufficient number of array divisions, and it is easy to generate a rectangular spot that is more elongated and uniform.

In addition, although the configuration of the rod 403 in which the shape of the incident surface INP, the shape of the emission surface EXP, and the cross-sectional shape of the rod portion are the same has been exemplified, a rod having a configuration in which the shape of the incident surface INP and the shape of the emission surface EXP are different from each other like a so-called tapered rod may be used.

Furthermore, in the first to fourth embodiments, the transfer optical systems used to transfer an image, that is, the first transfer lenses 200 (first transfer optical system), the second transfer optical system 320, and the relay lenses 406 are desirably configured in such a way that both sides are telecentric. However, other configurations may be adopted. As one or more of these transfer optical systems, for example, a so-called anamorphic optical system (anamorphic lens) having different optical characteristics in two cross sections around an optical axis may be adopted.

Figure 17A:
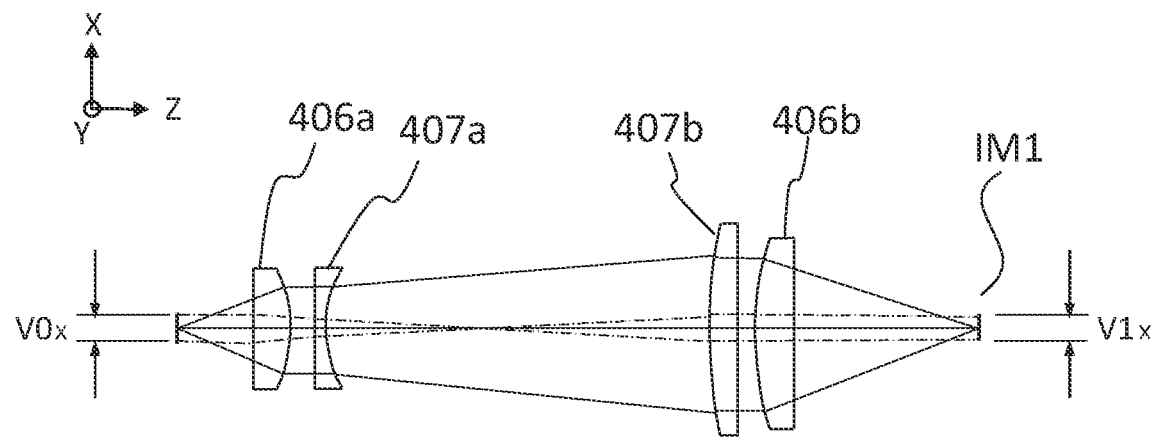
FIG. 17A is a view of an anamorphic optical system that can be used in each embodiment as viewed from one direction.
Figure 17B:
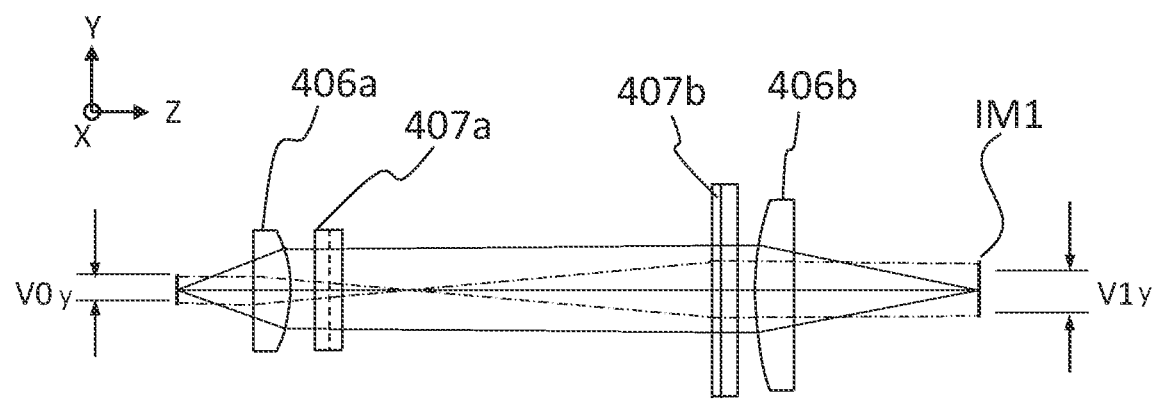
FIG. 17B is a view of the anamorphic optical system that can be used in each embodiment as viewed from a direction orthogonal to that in FIG. 17A.

FIGS. 17A and 17B illustrate examples in which the anamorphic optical system is adopted for the relay lenses 406 in the third embodiment or the fourth embodiment, and are views as viewed from directions orthogonal to each other. A combination of the front convex lens 406a and the rear convex lens 406b transfers an image enlarged at a magnification of 2 times. However, as the anamorphic optical system is configured by adding cylinder lenses (a concave lens 407a and a convex lens 407b) to which a curvature is added only in the X direction in such a way as to be afocal, it is possible to change only the size in one direction. In this example, an image emitted from the emission surface EXP of the rod 403 is transferred as the rectangular irradiation region IM1 that has the same size in the X direction and has a size enlarged at a magnification of two times in the Y direction. It is a matter of course that this is merely an example, and the magnification for enlargement or reduction can be arbitrarily set.

As described above, if the transfer optical system such as the first transfer lenses 200 (first transfer optical system), the second transfer optical system 320, or the relay lenses 406 is the anamorphic optical system, only the size in one direction can be reduced or enlarged, and thus, it is possible to adjust the NA or the aspect ratio of a transfer image, and it is possible to further improve light utilization efficiency.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 202249305, filed Mar. 25, 2022, and Japanese Patent Application No. 2022-106071, filed Jun. 30, 2022, which are hereby incorporated by reference herein in their entirety.

What is claimed is:

1. A projection display device comprising:
a plurality of semiconductor lasers;
a collimating lens configured to collimate a plurality of laser beams output from the plurality of semiconductor lasers;
an integrator illumination system configured to overlap the plurality of laser beams collimated by the collimating lens to form a rectangular illumination region;
a deflection element arranged on collimating lens side with respect to a position where the rectangular illumination region is formed by the integrator illumination system;
a transfer optical system configured to enlarge and transfer the rectangular illumination region deflection-scanned by the deflection element to a reflective optical modulation element; and
a projection lens configured to project video light output from the reflective optical modulation element.

2. The projection display device according to claim 1, wherein the deflection element includes an optical surface that is rotatable around a rotation axis and is formed along a circumference around the rotation axis,
the optical surface is formed in such a way that an inclination angle with respect to the rotation axis changes along the circumference, and
the inclination angle is formed in such a way as to recursively deflect the laser beam in a constant direction at a constant deflection speed, as the optical surface continuously rotates at a constant speed.

3. The projection display device according to claim 1, wherein the plurality of semiconductor lasers is arranged in such a way that slow axis directions and fast axis directions are each aligned,
a longitudinal direction of the rectangular illumination region corresponds to the slow axis direction of the semiconductor laser,
a transverse direction of the rectangular illumination region corresponds to the fast axis direction of the semiconductor laser, and the deflection element performs deflection-scanning by the laser beam in the transverse direction of the rectangular illumination region.

4. The projection display device according to claim 1, wherein the integrator illumination system includes any one of a microlens array in which spherical microlenses are two-dimensionally arranged, a diffraction-type diffusion element, and a microlens array in which striped microlenses are arranged.

5. The projection display device according to claim 1, wherein the integrator illumination system includes a rod, a condenser lens configured to condense the plurality of laser beams collimated by the collimating lens toward the rod, a diffusion element disposed in a vicinity of an incident surface of the rod, and a relay lens configured to transfer an image of an emission surface of the rod.

6. The projection display device according to claim 5, wherein the rod is a prism formed of an optical material or a hollow tube whose inner surface is a reflecting surface.

7. The projection display device according to claim 1, wherein at least one of the integrator illumination system and the transfer optical system includes an anamorphic lens.

8. The projection display device according to claim 1, wherein the transfer optical system includes a first transfer optical system configured to enlarge and transfer the rectangular illumination region to a diffusion plate, and a second transfer optical system configured to enlarge and transfer, to the reflective optical modulation element, the rectangular illumination region enlarged and transferred to the diffusion plate by the first transfer optical system.

9. The projection display device according to claim 1, further comprising a light combining unit configured to combine illumination lights output from illumination units for different color lights,
wherein each of the illumination units includes the plurality of semiconductor lasers, the collimating lens, the integrator illumination system, and the deflection element, and
the rectangular illumination regions output from the illumination units for the different color lights are enlarged and transferred to the reflective optical modulation element while being deflection-scanned in such a way as not to overlap each other.

* * * * *